United States Patent
Kanno

(10) Patent No.: US 9,997,930 B2
(45) Date of Patent: *Jun. 12, 2018

(54) WIRELESS POWER TRANSMISSION APPARATUS AND WIRELESS POWER TRANSFER SYSTEM

(71) Applicant: Panasonic Corporation, Osaka (JP)

(72) Inventor: Hiroshi Kanno, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/613,652

(22) Filed: Jun. 5, 2017

(65) Prior Publication Data

US 2017/0271884 A1 Sep. 21, 2017

Related U.S. Application Data

(63) Continuation of application No. 14/522,662, filed on Oct. 24, 2014, now Pat. No. 9,705,338.

(30) Foreign Application Priority Data

Oct. 29, 2013 (JP) .................. 2013-224598

(51) Int. Cl.
   H02J 5/00      (2016.01)
   H01F 38/14     (2006.01)
   (Continued)

(52) U.S. Cl.
   CPC ............. H02J 5/005 (2013.01); H01F 38/14 (2013.01); H02J 7/025 (2013.01); H02J 50/80 (2016.02)

(58) Field of Classification Search
   CPC . H02J 5/005; H02J 50/80; H02J 7/025; H01F 38/14
   (Continued)

(56) References Cited

U.S. PATENT DOCUMENTS 9,705,338 B2 * 7/2017 Kanno .................. H02J 5/005
2010/0001845 A1   1/2010 Yamashita
(Continued)

FOREIGN PATENT DOCUMENTS

CN     102918748    2/2013
JP     2010-016985  1/2010
(Continued)

OTHER PUBLICATIONS

Extended European Search Report dated May 11, 2015 in corresponding European Application No. 14189890.8.

(Continued)

*Primary Examiner* — Jared Fureman
*Assistant Examiner* — Win Htun
(74) *Attorney, Agent, or Firm* — Wenderoth, Lind & Ponack, L.L.P.

(57) ABSTRACT

A wireless power transmission apparatus according to the present disclosure includes a power transmission antenna, receiver circuits, and a control circuit. The power transmission antenna transmits high-frequency power at each of frequencies to wireless power reception apparatuses. Each of the receiver circuits obtains, from a corresponding one of the wireless power reception apparatuses, the value of a required voltage of the wireless power reception apparatus and the value of a power reception voltage received by the wireless power reception apparatus from the wireless power transmission apparatus. The control circuit obtains the required voltage value and the power reception voltage value from each of the receiver circuits, and controls the frequency of the high-frequency power. The control circuit changes the frequency of the high-frequency power so that the sum total of errors between the required voltage and the power reception voltage is minimized.

4 Claims, 15 Drawing Sheets

(51) Int. Cl.
    *H02J 7/02*      (2016.01)
    *H02J 50/80*     (2016.01)
(58) Field of Classification Search
    USPC .......................................................... 307/104
    See application file for complete search history.

(56) References Cited

U.S. PATENT DOCUMENTS

| | | |
|---|---|---|
| 2012/0274149 A1 | 11/2012 | Kann et al. |
| 2012/0306284 A1 | 12/2012 | Lee et al. |
| 2013/0002036 A1 | 1/2013 | Kamata |
| 2013/0006296 A1 | 1/2013 | McGuckin, Jr. et al. |
| 2013/0057078 A1 | 3/2013 | Lee et al. |
| 2013/0062961 A1 | 3/2013 | Park et al. |
| 2014/0091641 A1 | 4/2014 | Ichikawa |
| 2016/0006270 A1* | 1/2016 | Hosotani ................. H01F 5/00 307/104 |
| 2016/0028443 A1 | 1/2016 | Kim et al. |
| 2016/0149435 A1 | 5/2016 | Nago |
| 2016/0211703 A1* | 7/2016 | Eguchi ................. H04B 5/0037 |

FOREIGN PATENT DOCUMENTS

| | | |
|---|---|---|
| JP | 2013-034367 | 2/2013 |
| WO | 2007/020583 | 2/2007 |
| WO | 2012/081519 | 6/2012 |
| WO | 2012/164744 | 12/2012 |

OTHER PUBLICATIONS

English translation of Chinese Search Report dated May 6, 2016 in related Chinese Application No. 201410587664.2.

* cited by examiner

WIRELESS POWER TRANSMISSION APPARATUS AND WIRELESS POWER TRANSFER SYSTEM

BACKGROUND

1. Technical Field

The present disclosure relates to a wireless power transmission apparatus and a wireless power transfer system which transmit power in a non-contact manner through magnetic coupling between a power transmission coil and a power reception coil.

2. Description of the Related Art

Recently, various types of mobile equipment including a cellular phone have become popular. The amount of power consumption of the mobile equipment has been increasing due to improvement in the functions and the performance of the mobile equipment and due to increased variety of content. An increase in the amount of power consumption of mobile equipment that operates with a battery having a predetermined capacitance causes the operation time of the mobile equipment to be shortened. As a technology for compensating the limitation on the capacitance of a battery, a wireless power transfer system is receiving attention. The wireless power transfer system transmits power in a non-contact manner from a wireless power transmission apparatus to a wireless power reception apparatus through electromagnetic induction between a power transmission coil of the wireless power transmission apparatus and a power reception coil of the wireless power reception apparatus. In particular, a wireless power transfer system using a power transmission coil and a power reception coil of resonance type (coupling of a resonant magnetic field) is capable of maintaining high transfer efficiency even when the position of the power transmission coil is misaligned with that of the power reception coil. Therefore, applications of this technology in various fields are expected.

For example, wireless power transfer systems disclosed in Japanese Unexamined Patent Application Publication No. 2010-016985 (PTL 1), International Publication No. 2012/081519 (PTL 2), International Publication No. 2012/164744 (PTL 3), and Japanese Unexamined Patent Application Publication No. 2013-034367 (PTL 4) are known. According to the wireless power transfer systems in PTL 1 to PTL 4, two coils are coupled through a high-frequency magnetic field which occurs in a space near the coils, whereby power is transmitted in a non-contact (wireless) manner through the space between the coils.

However, in the related art, simultaneous power supply from a wireless power transmission apparatus to multiple wireless power reception apparatuses fails to be adequately performed in a non-contact manner.

SUMMARY

It is an object of the present disclosure to provide a wireless power transmission apparatus and a wireless power transfer system which enable simultaneous power supply from one wireless power transmission apparatus to multiple wireless power reception apparatuses to be adequately performed in a non-contact manner.

A wireless power transmission apparatus according to an aspect of the present disclosure includes a power transmission antenna, receiver circuits, and a control circuit. The power transmission antenna transmits high-frequency power corresponding to each of multiple frequencies to multiple wireless power reception apparatuses. Each of the receiver circuits obtains, from a corresponding one of the wireless power reception apparatuses, a required voltage value of the wireless power reception apparatus and a power reception voltage value received by each of the wireless power reception apparatuses from the wireless power transmission apparatus. The control circuit obtains the required voltage value and the power reception voltage value from each of the receiver circuits, and controls the frequency of the high-frequency power that is to be transmitted to each of the wireless power reception apparatuses. The control circuit changes the frequency of the high-frequency power that is to be transmitted from the power transmission antenna to each of the wireless power reception apparatuses so that the sum total of errors, each of which occurs between the required voltage and the power reception voltage of a corresponding one of the wireless power reception apparatuses, is minimized.

According to the wireless power transmission apparatus of the present disclosure, simultaneous power supply from one wireless power transmission apparatus to multiple wireless power reception apparatuses can be adequately performed in a non-contact manner.

DETAILED DESCRIPTION

Findings from which Disclosure is Derived

Figure 1:
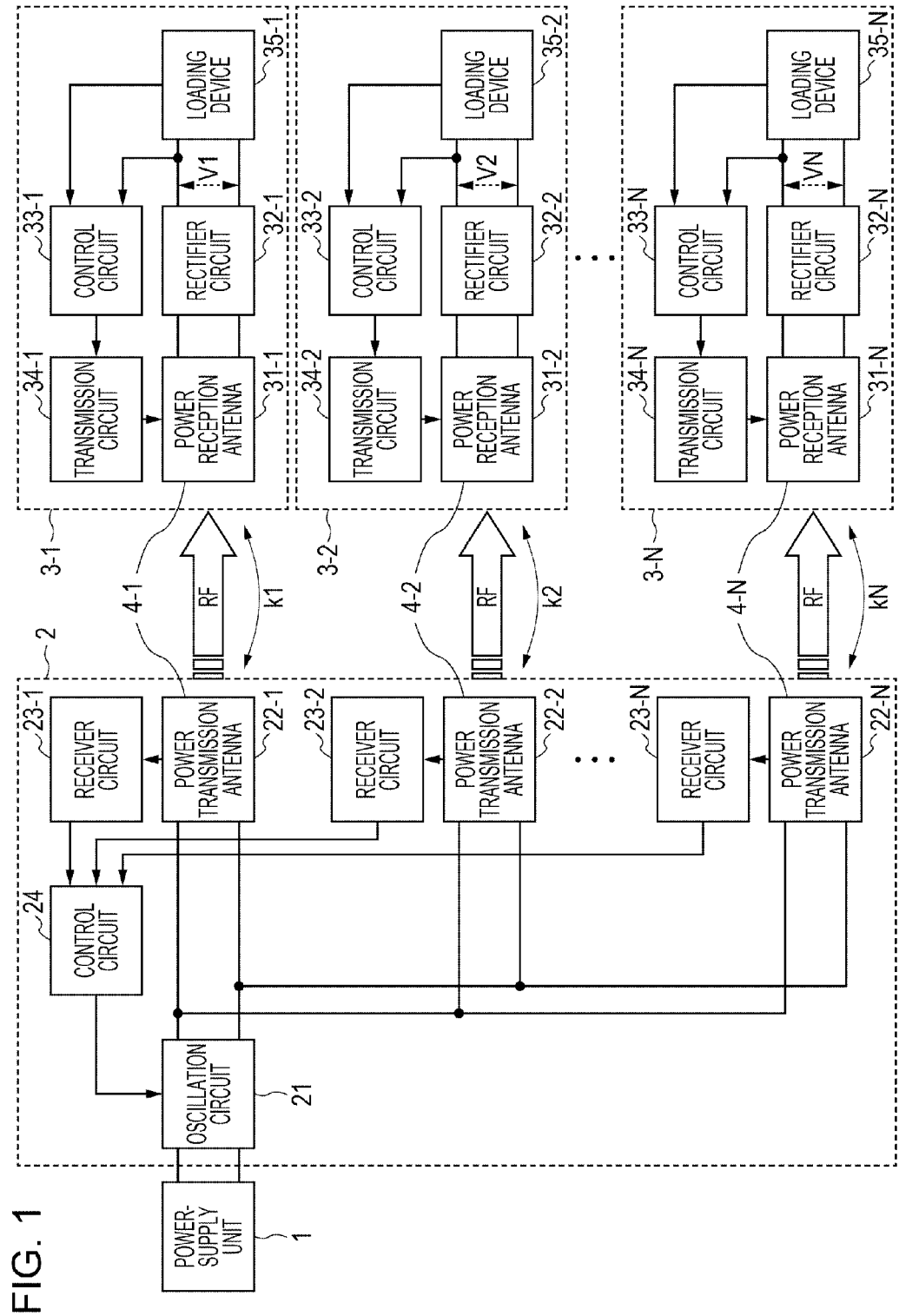
FIG. 1 is a block diagram illustrating the configuration of a wireless power transfer system according to a first embodiment.

The inventor found that there arises the following problem with respect to the wireless power transfer system described in Description of the Related Art.

In PTL 1 to PTL 3, a typical wireless power transfer system is merely disclosed in which one wireless power transmission apparatus having a power transmission coil transfers power to one wireless power reception apparatus having a power reception coil.

In contrast, in PTL 4, a wireless power transmission apparatus having a power transmission coil is disclosed which simultaneously supplies power in a non-contact manner from the power transmission coil to multiple wireless power reception apparatuses. In the method disclosed in PTL 4, the frequency of the power transmission coil is determined on the basis of the sum of power supplied from the power transmission coil to the wireless power reception apparatuses. Hereinafter, the frequency of the power transmission coil may translate to the drive frequency of the circuit located at the wireless power transmission apparatus side.

Generally, it is expected that different wireless power reception apparatuses have respective different load characteristics and require respective different power levels. In addition, it is expected that different loads connected to respective different wireless power reception apparatuses operate in respective different input voltage ranges. For example, in the case where wireless power reception apparatuses are mobile equipment having a battery (secondary battery) and where a wireless power transmission apparatus is used to charge the batteries, finely-tuned control of the charging voltage needs to be performed in accordance with the different loads. However, when the drive frequency of the circuit located at the wireless power transmission apparatus side is determined on the basis of the sum of power supplied from the power transmission coil to the wireless power reception apparatuses, power to be transmitted to the wireless power reception apparatuses fails to be individually controlled.

Therefore, in the case where power is simultaneously supplied from the power transmission coil to the wireless power reception apparatuses, the drive frequency of the circuit located at the wireless power transmission apparatus side in the wireless power transmission apparatus may be determined, for example, so that the sum total of power received by the wireless power reception apparatuses is maximized. However, in a wireless power reception apparatus, a difference (error) may occur between the required voltage required by the wireless power reception apparatus and the voltage which is received by the wireless power reception apparatus and which is output to the load. In particular, a case in which the voltage which is output to the load exceeds the required voltage by a large amount may occur. The excessive voltage which is output to the load may interfere with a safe charging operation in the wireless power reception apparatus, and may also damage a circuit element included in the wireless power reception apparatus. In addition, as another state, a case in which the voltage which is output to the load fails to reach the required voltage may occur. As a result, there arises an issue in that it is difficult to achieve a stable charging operation and a stable power supply operation. Hereinafter, the voltage which is output to the load may translate to an output voltage.

The reason of the above-described issue may be as follows.

For example, when the drive frequency of the circuit located at the wireless power transmission apparatus side is determined so that the sum total of power received by the wireless power reception apparatuses is maximized, power supplied to each of the wireless power reception apparatuses satisfies the required power of the wireless power reception apparatus. However, even in this case, each value of the resonant frequency, the required power, the required voltage, the load to which the power reception coil is connected, or the coupling coefficient between the power transmission coil and the power reception coil in some wireless power reception apparatuses does not necessarily match each value of those in the other wireless power reception apparatus. Because of this, in any of the wireless power reception apparatuses, an error may occur between the required voltage and the output voltage.

Thus, in the above-described example, the configuration in which the drive frequency of the circuit located at the wireless power transmission apparatus side is determined so that the sum total of power received by the wireless power reception apparatuses is maximized fails to achieve an adequate charging operation and an adequate power supply operation for the wireless power reception apparatuses.

That is, reduction in the error between the required voltage and the power reception voltage in each of the wireless power reception apparatuses is not taken into account.

That is, in any of PTL 1 to PTL 4, there is no idea that, in multiple wireless power reception apparatuses, the error between the required voltage and the power reception voltage is to be minimized. Therefore, even when the drive frequency of the circuit located at the wireless power transmission apparatus side is determined so that the sum total of power received by multiple wireless power reception apparatuses is maximized, the power reception voltage of each of the wireless power reception apparatuses may fail to satisfy a target voltage range. The target voltage range is a voltage range whose center is located at the required voltage of a wireless power reception apparatus and which is allowed by the wireless power reception apparatus.

Therefore, when power is simultaneously supplied from one wireless power transmission apparatus to multiple wireless power reception apparatuses, it is desirable that the wireless power transmission apparatus exert control so that the power reception voltage of each of the wireless power reception apparatuses satisfies the target voltage range. It is desirable that one wireless power transmission apparatus simultaneously and adequately supply power in a non-contact manner to multiple wireless power reception apparatuses.

From the above-described discussion, the inventor achieved the following aspects of the present disclosure.

A wireless power transmission apparatus according to an aspect of the present disclosure is provided in a wireless power transfer system transmitting a high-frequency power corresponding to each of multiple frequencies to multiple wireless power reception apparatuses. The wireless power transmission apparatus includes a power transmission antenna, multiple receiver circuits, and a control circuit. The power transmission antenna transmits the high-frequency power corresponding to each of multiple frequencies to the wireless power reception apparatuses. Each of the receiver circuits obtains, from a corresponding one of the wireless power reception apparatuses, a required voltage value of the corresponding one of the wireless power reception apparatuses and values of power reception voltages corresponding to the wireless power reception apparatuses. The power reception voltages correspond to the frequencies. The control circuit obtains the required voltage values and the power reception voltage values from the receiver circuits, and controls a frequency of the high-frequency power which is to be transmitted to the wireless power reception apparatuses. The control circuit sequentially uses a frequency from the frequencies so as to transmit the high-frequency power corresponding to the frequency to the wireless power reception apparatuses. The control circuit compares a first sum total with a second sum total. The first sum total is obtained by summing errors, each of which occurs between the required voltage and the power reception voltage of a corresponding one of the wireless power reception apparatuses in the case where the high-frequency power corresponding to a first frequency among the frequencies is transmitted. The second sum total is obtained by summing errors, each of which occurs between the required voltage and the power reception voltage of a corresponding one of the wireless power reception apparatuses in the case where the high-frequency power corresponding to a second frequency among the frequencies is transmitted. The control circuit sets a third frequency close to a frequency corresponding to a smaller sum total of the first sum total and the second sum total, and transmits the high-frequency power corresponding to the third frequency to each of the wireless power reception apparatuses. The control circuit causes the error of each of the wireless power reception apparatuses to converge to a predetermined criterion.

According to the aspect, when power is simultaneously supplied from one wireless power transmission apparatus to multiple wireless power reception apparatuses, the sum total of errors, each of which occurs between the required voltage of a corresponding one of the wireless power reception apparatuses and the power reception voltage received from the wireless power transmission apparatus by the wireless power reception apparatus, is decreased. A frequency at which the errors are decreased is used to transmit high-frequency power to each of the wireless power reception apparatuses, whereby the power reception voltage may be controlled so that the power reception voltage satisfies the target voltage range in each of the wireless power reception apparatuses. As a result, power may be simultaneously and adequately supplied in a non-contact manner from the one wireless power transmission apparatus to the multiple wireless power reception apparatuses. The one wireless power transmission apparatus includes only one oscillation circuit which transmits high-frequency power corresponding to each of multiple frequencies to the power transmission antenna, for the wireless power reception apparatuses.

In the aspect, for example, the control circuit may compare a smaller sum total of the first sum total and the second sum total with a third sum total obtained by summing errors, each of which occurs between the required voltage and the power reception voltage of a corresponding one of the wireless power reception apparatuses in the case where the high-frequency power corresponding to the third frequency is transmitted, may set a fourth frequency closer to a frequency corresponding to a further smaller sum total among the smaller sum total and the third sum total, and may transmit the high-frequency power corresponding to the fourth frequency to each of the wireless power reception apparatuses. The control circuit may determine a frequency at which a sum total of the errors is minimized, by setting the fourth frequency repeatedly, and may transmit the high-frequency power corresponding to the frequency at which the sum total of the errors is minimized to each of the wireless power reception apparatuses.

According to the aspect, by determining a frequency at which the sum total of the errors becomes smaller repeatedly, a frequency at which the sum total of the errors is minimized is determined. Therefore, the power reception voltage of each of the wireless power reception apparatuses may be controlled so that the power reception voltage satisfies the target voltage range.

In the aspect, for example, the wireless power transmission apparatus may further include a voltage adjustment circuit that changes a voltage received from a power-supply unit, so as to output the voltage to the power transmission antenna. After the sum total of the errors is minimized, when an error between the required voltage and the power reception voltage exceeds a predetermined threshold value in at least one of the wireless power reception apparatuses, the control circuit may decrease the voltage which is output from the voltage adjustment circuit to the power transmission antenna, in such a manner that the error between the required voltage and the power reception voltage of the at least one of the wireless power reception apparatuses becomes equal to or smaller than the threshold value.

According to the aspect, after the sum total of the errors is minimized, in at least one of the wireless power reception apparatuses, the error of the wireless power reception apparatus may exceed the predetermined threshold value. In this case, the output voltage of the voltage adjustment circuit is decreased so that the error becomes equal to or smaller than the threshold value, whereby the power reception voltage of each of the wireless power reception apparatuses may be controlled so that the power reception voltage satisfies the target voltage range.

In the aspect, for example, at least one of the power transmission antenna and a power reception antenna of a wireless power reception apparatus among the wireless power reception apparatuses may include a circuit element having a variable circuit constant. The control circuit may change at least one of the circuit constant of the power transmission antenna and the circuit constant of the power reception antenna.

Even when the transmission power control according to any of the above-described aspects is performed, the power reception voltages of all of the wireless power reception apparatuses may still fail to satisfy the target voltage range. Therefore, according to the aspect, at least one of the circuit constant of the power transmission antenna and that of the power reception antenna is changed to change frequency characteristics of the sum total of the errors. That is, the minimum of the sum total of the errors is changed. As a result, the power reception voltage of each of the wireless power reception apparatuses may be controlled so that the power reception voltage satisfies the target voltage range.

In the aspect, for example, the error of each of the wireless power reception apparatuses may be calculated on the basis of the required voltage of the wireless power reception apparatus, the power reception voltage of the wireless power reception apparatus, the average of the required voltages of the multiple wireless power reception apparatuses, and the average of the power reception voltages of the multiple wireless power reception apparatuses.

In the aspect, for example, the wireless power transmission apparatus may include a power transmission circuit that generates high-frequency power having a variable frequency and that supplies the high-frequency power to the power transmission antenna. The power transmission circuit may include an electric power conversion circuit that generates a variable output voltage from the input voltage, and an inverter circuit that generates high-frequency power having a variable frequency from the output voltage of the electric power conversion circuit.

In the aspect, for example, the power transmission circuit may include an inverter circuit that generates high-frequency power having a variable frequency by changing the phase of a signal for switching multiple switches.

In the aspect, for example, the power transmission circuit may include an inverter circuit that generates high-frequency power having a variable output voltage by performing switching with a variable duty ratio.

The aspect may be achieved as a wireless power transfer system having the wireless power transmission apparatus and the multiple wireless power reception apparatuses.

In the aspect, for example, each of the wireless power reception apparatuses may include a power reception antenna including a resonant circuit having a power reception coil, and a transmission circuit that transmits, to the wireless power transmission apparatus, the value of the required voltage of the wireless power reception apparatus and the value of the power reception voltage received from the wireless power transmission apparatus by the wireless power reception apparatus.

In the aspect, for example, each of the wireless power reception apparatuses may further include a battery. The battery may be charged by receiving high-frequency power from the wireless power transmission apparatus.

A wireless power transmission apparatus according to another aspect of the present disclosure is only one power transmission apparatus included in a wireless power transfer system which also includes multiple wireless power reception apparatuses. Each of the wireless power reception apparatuses includes a power reception antenna having a resonant circuit having a power reception coil. The wireless power transmission apparatus includes at least one power transmission antenna, a power transmission circuit, a receiver circuit, and a control circuit. The at least one power transmission antenna includes a resonant circuit having a power transmission coil, and is electromagnetically coupled to the power reception antenna of each of the wireless power reception apparatuses. The power transmission circuit generates high-frequency power having a variable frequency and supplies the high-frequency power to the power transmission antenna. The receiver circuit obtains, from each of the wireless power reception apparatuses, the value of the required voltage of the wireless power reception apparatus and the value of the power reception voltage received from the wireless power transmission apparatus by the wireless power reception apparatus. The control circuit controls the power transmission circuit. For each of the wireless power reception apparatuses, the control circuit calculates a relative error index representing an error between the required voltage and the power reception voltage of the wireless power reception apparatus. The control circuit calculates an overall error index of the multiple wireless power reception apparatuses from the relative error indexes of the wireless power reception apparatuses. The control circuit changes the frequency of the high-frequency power generated by the power transmission circuit so that the overall error index is minimized.

In the aspect, for example, the relative error index of each of the wireless power reception apparatuses may be calculated on the basis of the required voltage of the wireless power reception apparatus, the power reception voltage of the wireless power reception apparatus, the average of the required voltages of the multiple wireless power reception apparatuses, and the average of the power reception voltages of the multiple wireless power reception apparatuses.

In the aspect, for example, the power transmission circuit may have a variable output voltage. After the overall error index is minimized, when, in at least one of the wireless power reception apparatuses, the error between the required voltage and the power reception voltage of the wireless power reception apparatus exceeds a predetermined threshold value, the control circuit may decrease the output voltage of the power transmission circuit until the error becomes equal to or smaller than the threshold value.

In the aspect, the power transmission circuit may include an electric power conversion circuit that generates a variable output voltage from the input voltage, and an inverter circuit that generates high-frequency power having a variable frequency from the output voltage of the electric power conversion circuit.

In the aspect, for example, the power transmission circuit may include an inverter circuit that generates high-frequency power having a variable frequency by changing the phase of a signal for switching multiple switches.

In the aspect, for example, the power transmission circuit may include an inverter circuit that generates high-frequency power having a variable output voltage by performing switching with a variable duty ratio.

In the aspect, for example, at least one of the power transmission antenna and a power reception antenna of a wireless power reception apparatus among the wireless power reception apparatuses may include a circuit element having a variable circuit constant. The control circuit may change at least one of the circuit constant of the power transmission antenna and the circuit constant of the power reception antenna.

The aspect may be achieved as a wireless power transfer system having the wireless power transmission apparatus and the multiple wireless power reception apparatuses.

In the aspect, for example, each of the wireless power reception apparatuses may include a power reception antenna including a resonant circuit having a power reception coil, and a transmission circuit that transmits, to the wireless power transmission apparatus, the value of the required voltage of the wireless power reception apparatus and the value of the power reception voltage received from the wireless power transmission apparatus by the wireless power reception apparatus.

In the aspect, for example, each of the wireless power reception apparatuses may further include a battery. The battery may be charged by receiving high-frequency power from the wireless power transmission apparatus.

A wireless power transfer system according to embodiments will be described below with reference to the drawings.

First Embodiment

FIG. 1 is a block diagram illustrating the configuration of a wireless power transfer system according to a first embodiment. The wireless power transfer system in FIG. 1 includes one wireless power transmission apparatus 2 connected to a power-supply unit 1 supplying direct current, and multiple wireless power reception apparatuses 3-1 to 3-N supplied with power from the wireless power transmission apparatus 2.

The wireless power transmission apparatus 2 in FIG. 1 includes an oscillation circuit 21, multiple power transmission antennas 22-1 to 22-N, multiple receiver circuits 23-1 to 23-N, and a control circuit 24. The oscillation circuit 21 is an inverter circuit which generates high-frequency power having a variable frequency f0 and which supplies the high-frequency power to the power transmission antennas 22-1 to 22-N. Each of the power transmission antennas 22-1 to 22-N includes a resonant circuit including a power transmission coil, and is electromagnetically coupled to a corresponding one of power reception antennas 31-1 to 31-N (described below) of the wireless power reception apparatuses 3-1 to 3-N. The receiver circuits 23-1 to 23-N which are connected to the power transmission antennas 22-1 to 22-N, respectively, receive load modulation signals transmitted from the wireless power reception apparatuses 3-1 to 3-N to the wireless power transmission apparatus 2 by changing the power consumption of each of the wireless power reception apparatuses 3-1 to 3-N, and demodulate the load modulation signals. Thus, each of the receiver circuits 23-1 to 23-N obtains, from a corresponding one of the wireless power reception apparatuses 3-1 to 3-N, the value of the required voltage of the wireless power reception apparatus and the value of the power reception voltage received by the wireless power reception apparatus from the wireless power transmission apparatus 2, and transmits the values to the control circuit 24. The control circuit 24 controls the oscillation circuit 21, and changes the frequency f0 of the high-frequency power generated by the oscillation circuit 21.

The frequency f0 of the high-frequency power generated by the oscillation circuit 21 is set, for example, 50 Hz to 300 GHz, in a certain example, 100 kHz to 10 GHz, or typically, 500 kHz to 20 MHz. Depending on the use, the frequency f0 is set to a range of 10 kHz to 1 GHz, 20 kHz to 20 MHz, 100 kHz to 205 kHz, or 20 kHz to 100 kHz. Herein, power transferred by using a vibrating magnetic field at this frequency f0 is called "high-frequency power (RF power)".

The wireless power reception apparatus 3-1 in FIG. 1 includes a power reception antenna 31-1, a rectifier circuit 32-1, a control circuit 33-1, a transmission circuit 34-1, and a loading device 35-1. The power reception antenna 31-1 includes a resonant circuit including a power reception coil, and is electromagnetically coupled to at least one of the power transmission antennas 22-1 to 22-N, i.e., the power transmission antenna 22-1. When there are multiple wireless power reception apparatuses, the power transmission antennas 22-1 to 22-N correspond to the power reception antennas 31-1 to 31-N of the wireless power reception apparatuses 3-1 to 3-N, for example, in a one-to-one manner. The rectifier circuit 32-1 rectifies and smoothes power received from the wireless power transmission apparatus 2 via the power reception antenna 31-1, so as to supply the power to the loading device 35-1. The control circuit 33-1 obtains an output voltage V1 value of the rectifier circuit 32-1 (that is, the value of power reception voltage received by the wireless power reception apparatus 3-1 from the wireless power transmission apparatus 2), and further obtains the value of the required voltage required by the loading device 35-1. The transmission circuit 34-1 further includes a load modulation circuit which generates a load modulation signal, for example, by changing a power consumption of the wireless power reception apparatus 3-1. Thus, the transmission circuit 34-1 transmits the required voltage value of the wireless power reception apparatus 3-1 and the power reception voltage V1 value of the wireless power reception apparatus 3-1 to the wireless power transmission apparatus 2 under the control of the control circuit 33-1. The loading device 35-1 is, for example, a battery. When the loading device 35-1 is a battery, the wireless power reception apparatus 3-1 is supplied with high-frequency power from the wireless power transmission apparatus 2 so that the battery is charged.

Each of the wireless power reception apparatuses 3-2 to 3-N in FIG. 1 has a configuration similar to that of the wireless power reception apparatus 3-1.

The wireless power transfer system in FIG. 1 includes a first transmission and reception antenna pair 4-1 constituted by the first power transmission antenna 22-1 and the first power reception antenna 31-1, a second transmission and reception antenna pair 4-2 constituted by the second power transmission antenna 22-2 and the second power reception antenna 31-2, . . . , and a Nth transmission and reception antenna pair 4-N constituted by the Nth power transmission antenna 22-N and the Nth power reception antenna 31-N, and power is transferred in a non-contract manner between the members in a transmission and reception antenna pair through magnetic field coupling. In the nth transmission and reception antenna pair ($1 \leq n \leq N$), the power transmission antenna 22-$n$ and the power reception antenna 31-$n$ are coupled to each other through a magnetic field with an adequate coupling coefficient kn. The adequate coupling coefficient kn is set to a value equal to or larger than 0.01 and smaller than 1, preferably, equal to or larger than 0.1 and equal to or smaller than 0.75. To obtain the adequate coupling coefficient kn, a power transmission antenna and a power reception antenna are disposed close to each other.

Figure 2:
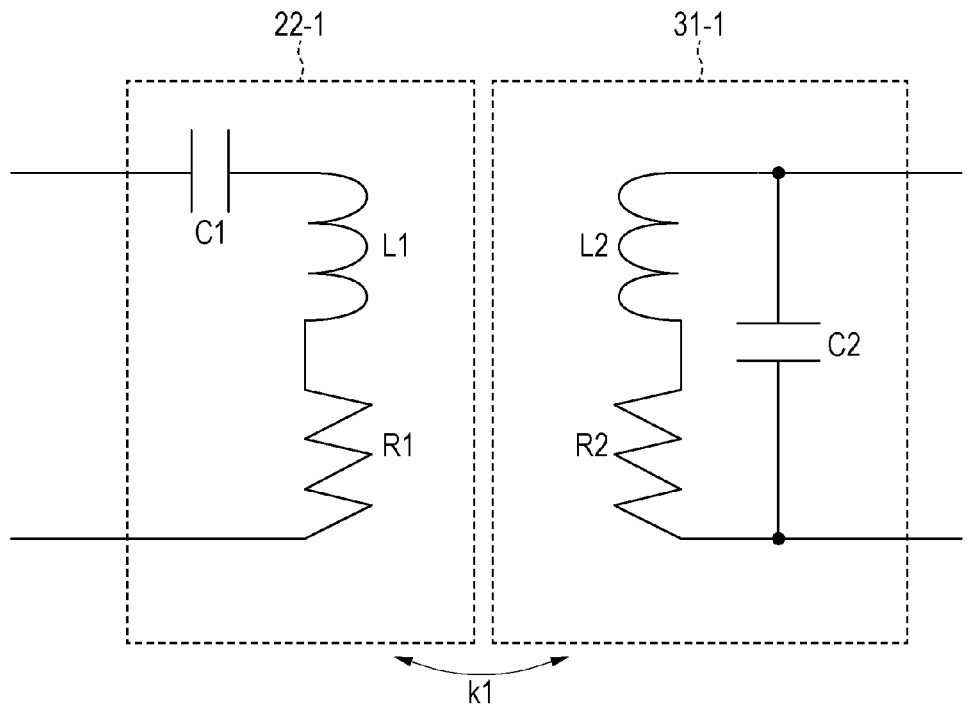
FIG. 2 is an equivalent circuit diagram illustrating exemplary implementation of a power transmission antenna and a power reception antenna illustrated in FIG. 1.
Figure 3:
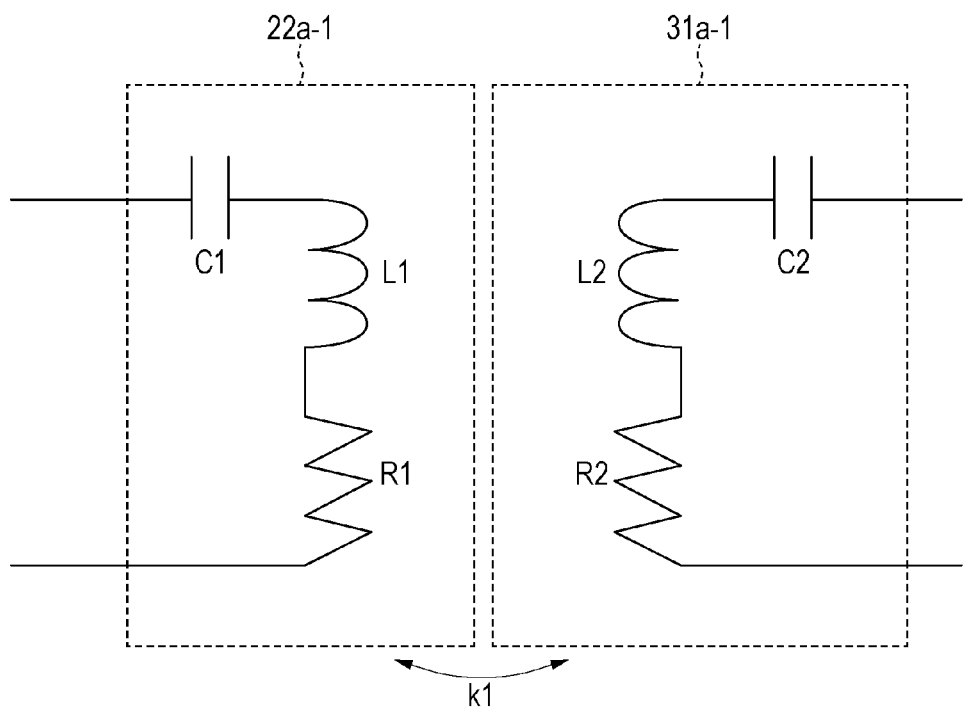
FIG. 3 is an equivalent circuit diagram illustrating a power transmission antenna and a power reception antenna according to a first modified example of the power transmission antenna and the power reception antenna illustrated in FIG. 1.
Figure 4:
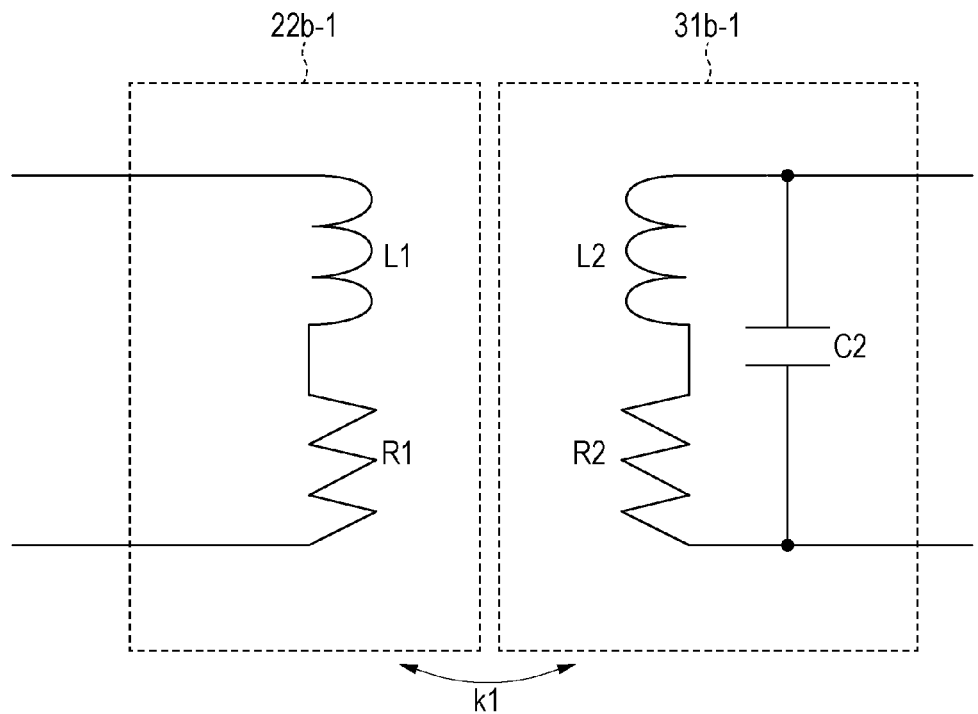
FIG. 4 is an equivalent circuit diagram illustrating a power transmission antenna and a power reception antenna according to a second modified example of the power transmission antenna and the power reception antenna illustrated in FIG. 1.
Figure 5:
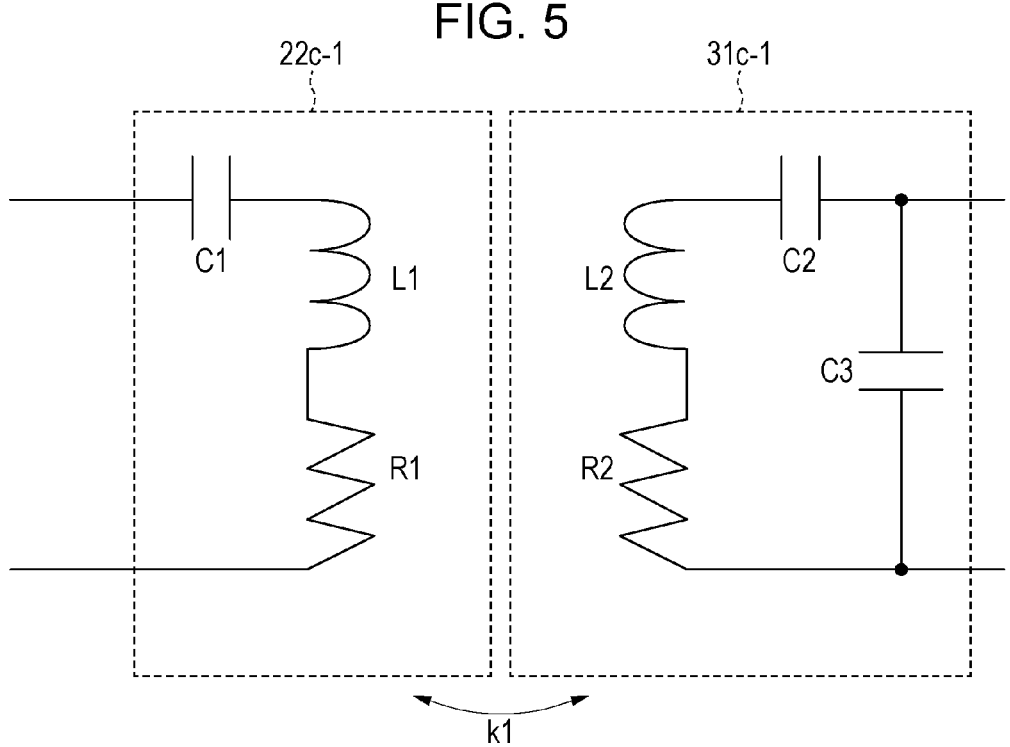
FIG. 5 is an equivalent circuit diagram illustrating a power transmission antenna and a power reception antenna according to a third modified example of the power transmission antenna and the power reception antenna illustrated in FIG. 1.

FIG. 2 is an equivalent circuit diagram illustrating exemplary implementation of the power transmission antenna 22-1 and the power reception antenna 31-1 illustrated in FIG. 1. The power transmission antenna 22-1 and the power reception antenna 31-1 include at least inductors L1 and L2 having a coil shape, and are coupled to each other through magnetic field coupling. At least one of the power transmission antenna and the power reception antenna is provided with a capacitor so that resonance occurs at a frequency close to the frequency f0. For example, as illustrated in FIG. 2, the power transmission antenna 22-1 is a series resonance circuit in which the inductor L1 and a capacitor C1 are connected to each other in a series manner, and the power reception antenna 31-1 is a parallel resonant circuit in which the inductor L2 and a capacitor C2 are connected to each other in a parallel manner. The series resonance circuit in the power transmission antenna 22-1 has a parasitic resistance component R1, and the parallel resonant circuit in the power reception antenna 31-1 has a parasitic resistance component R2. FIG. 3 is an equivalent circuit diagram illustrating a power transmission antenna 22$a$-1 and a power reception antenna 31$a$-1 according to a first modified example of the power transmission antenna 22-1 and the power reception antenna 31-1 illustrated in FIG. 1. FIG. 4 is an equivalent circuit diagram illustrating a power transmission antenna 22b-1 and a power reception antenna 31b-1 according to a second modified example of the power transmission antenna 22-1 and the power reception antenna 31-1 illustrated in FIG. 1. FIG. 5 is an equivalent circuit diagram illustrating a power transmission antenna 22c-1 and a power reception antenna 31c-1 according to a third modified example of the power transmission antenna 22-1 and the power reception antenna 31-1 illustrated in FIG. 1. The connection between an inductor and a capacitor may be made so as to achieve any of series resonance, parallel resonance, and the combination of both. Unlike the example in FIG. 2, the power transmission antenna may constitute a parallel resonant circuit, and the power reception antenna may constitute a series resonance circuit. One of the antennas may be a non-resonant circuit.

The other power transmission antennas 22-2 to 22-N and the other power reception antennas 31-2 to 31-N in FIG. 1 also have a configuration similar to those of the power transmission antennas and the power reception antennas illustrated in FIGS. 2 to 5.

As will be described in a third embodiment, the resonant frequencies of the power transmission antennas 22-1 to 22-N and the resonant frequencies of the power reception antennas 31-1 to 31-N may be variable.

The high-frequency power which is output from the oscillation circuit 21 is input to the power transmission antennas 22-1 to 22-N connected to the oscillation circuit 21. The power transmission antennas 22-1 to 22-N are coupled to the power reception antennas 31-1 to 31-N, respectively, through a resonant magnetic field formed by the resonant circuits in the antennas, and the power reception antennas 31-1 to 31-N may receive the high-frequency power transmitted by the power transmission antennas 22-1 to 22-N, respectively. The power reception antennas 31-1 to 31-N are not in contact with the power transmission antennas 22-1 to 22-N, and are spaced apart by, for example, approximately 1 mm to several meters from the power transmission antennas 22-1 to 22-N.

In the wireless power transfer system in FIG. 1, when the multiple wireless power reception apparatuses 3-1 to 3-N are simultaneously supplied with power, errors may occur between required voltages (target voltages) $Vc1, Vc2, \ldots,$ and $VcN$ of the wireless power reception apparatuses and power reception voltages $V1, V2, \ldots,$ and $VN$ received by the wireless power reception apparatuses from the wireless power transmission apparatus 2. The method for reducing the errors will be described below.

For each of the wireless power reception apparatuses 3-1 to 3-N, the control circuit 24 calculates a relative error index $En$ ($1 \leq n \leq N$) representing an error ($=|Vn-Vcn|$) between the required voltage $Vcn$ and the power reception voltage $Vn$ of the wireless power reception apparatus, and calculates an overall error index $Es$ of the wireless power reception apparatuses 3-1 to 3-N from the relative error indexes $E1$ to $EN$ of the wireless power reception apparatuses. The relative error index $En$ may be simply called an error.

The relative error indexes $E1$ to $EN$ of the wireless power reception apparatuses and the overall error index $Es$ may be defined as follows. The average of the required voltages $Vc1, Vc2, \ldots,$ and $VcN$ is represented by $Vcav$, and the average of the power reception voltages $V1, V2, \ldots,$ and $VN$ is represented by $Vav$. The relative error index $E1$ of the wireless power reception apparatus 3-1 is obtained, for example, by using the following expression.

$$E1=|(V1 \times Vcav/Vav)-Vc1| \quad \text{Expression 1}$$

The average $Vcav$ of the required voltages is defined in the following expression.

$$Vcav=(Vc1+Vc2+ \ldots +VcN)/N \quad \text{Expression 2}$$

The average $Vav$ of the power reception voltages may be a simple average of the power reception voltages $V1$ to $VN$, or may be a weighted average. In the case of a simple average, the average $Vav$ of the power reception voltages is defined in the following expression.

$$Vav=(V1+V2+ \ldots +VN)/N \quad \text{Expression 3}$$

The weighted average $Vav$ of power reception voltages is defined in the following expression.

$$Vav=(a1 \cdot V1+a2 \cdot V2+ \ldots +aN \cdot VN)/(a1+a2+ \ldots +aN) \quad \text{Expression 4}$$

The weighted average $Vav$ of the power reception voltages may be used, for example, to set the coefficient an which is large, to a wireless power reception apparatus 3-n ($1 \leq n \leq N$) having large required power.

In either case, the overall error index $Es$ of the wireless power reception apparatuses 3-1 to 3-N is defined from the relative error indexes $E1$ to $EN$, for example, in the following expression.

$$Es=E1+E2+ \ldots +EN \quad \text{Expression 5}$$

or $$Es=E1^2+E2^2+ \ldots +EN^2 \quad \text{Expression 6}$$

The overall error index $Es$ may be defined in consideration of weighting as in the following expression.

$$Es=b1 \times E1+b2 \times E2+ \ldots +bN \times EN \quad \text{Expression 7}$$

or $$Es=c1 \times E1^m+c2 \times E2^m+ \ldots +cN \times EN^m \text{ (}m\text{: real number)} \quad \text{Expression 8}$$

The control circuit 24 changes the frequency $f0$ of the high-frequency power generated by the oscillation circuit 21 so that the overall error index $Es$ is minimized.

Figure 6:
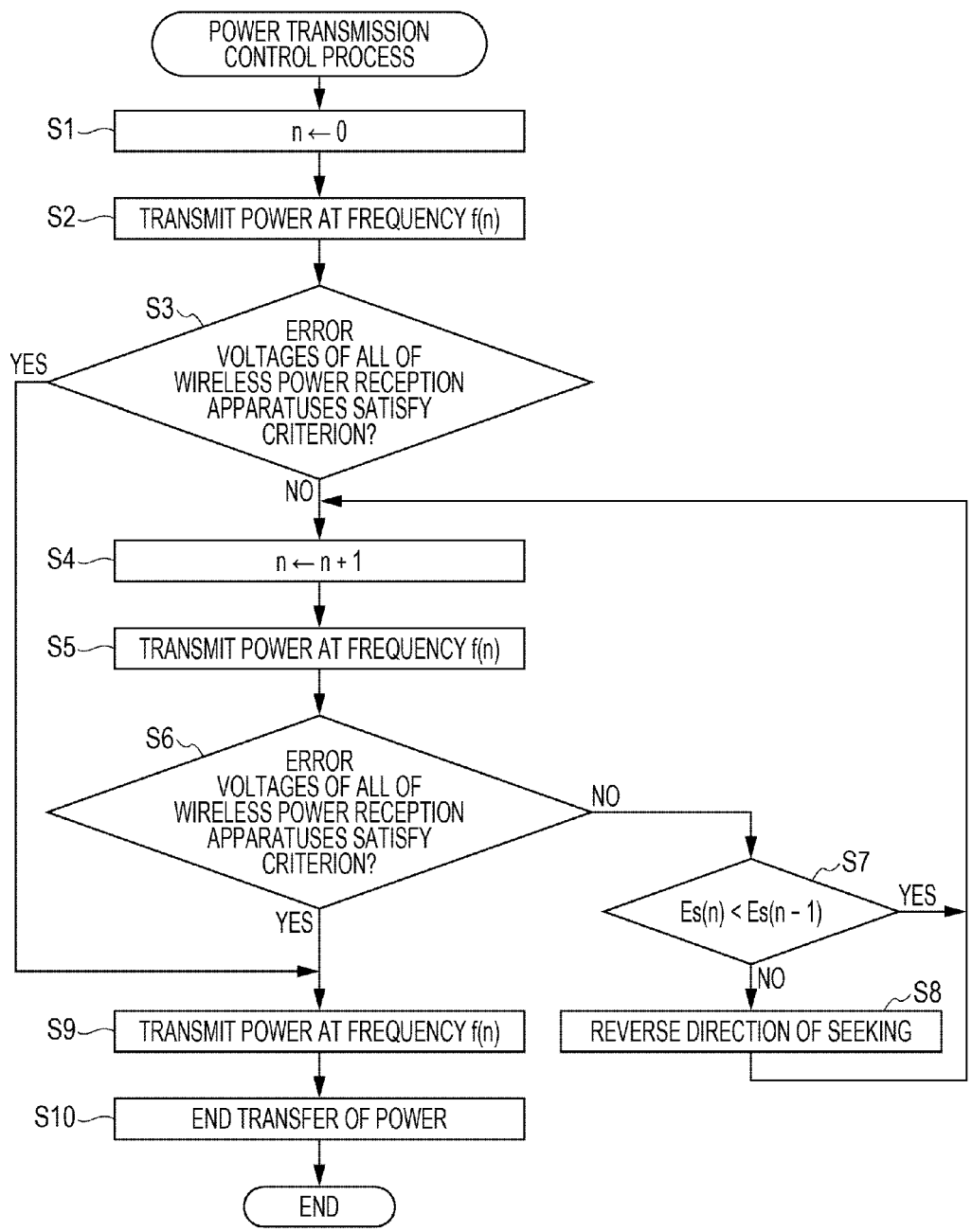
FIG. 6 is a flowchart of a power transmission control process performed by a control circuit of a wireless power transmission apparatus illustrated in FIG. 1.

FIG. 6 is a flowchart of a power transmission control process performed by the control circuit 24 of the wireless power transmission apparatus 2 in FIG. 1.

In step S1, the control circuit 24 initializes a parameter n for iteration to 0. In step S2, the control circuit 24 causes the oscillation circuit 21 to generate high-frequency power at a frequency $f(n)$ so that power transmission starts. The frequency $f(n)$ has a predetermined initial value $f(0)$ and a step size $\Delta f$. The frequency $f(n)$ is increased from the initial value $f(0)$ to a final value $f(L)$ with the step size $\Delta f$. The oscillation circuit 21 is set so as to be capable of outputting high-frequency power at each of the frequencies obtained by increasing the frequency from the initial value $f(0)$ to the final value $f(L)$ with the step size $\Delta f$. The step size $\Delta f$ may be non-constant.

After transmission of the high-frequency power from the wireless power transmission apparatus 2 to the wireless power reception apparatuses 3-1 to 3-N, the control circuit 24 obtains, from the wireless power reception apparatuses 3-1 to 3-N, the values of the required voltages $Vc1$ to $VcN$ of the wireless power reception apparatuses and the values of the power reception voltages $V1$ to $VN$ of the wireless power reception apparatuses. The control circuit 24 calculates the overall error voltage $Es(n)$ by using Expression 1 to Expression 8 from the required voltages $Vc1$ to $VcN$ and the power reception voltages $V1$ to $VN$, and stores the overall error voltage $Es(n)$ inside. In step S3, the control circuit 24 determines whether or not error voltages of all of the wireless power reception apparatuses 3-1 to 3-N satisfy a predetermined criterion. If the determination result is YES, the process proceeds to step S9. If the determination result is NO, the process proceeds to step S4. The error voltages may be the differences between the required voltages Vc1 to VcN and the power reception voltages V1 to VN, respectively, or may be the relative error indexes E1 to EN.

In step S4, the control circuit 24 increments the parameter n by 1. In step S5, the control circuit 24 causes the oscillation circuit 21 to generate high-frequency power at a new frequency f(n) so that power is transmitted. After transmission of the high-frequency power from the wireless power transmission apparatus 2 to the wireless power reception apparatuses 3-1 to 3-N, the control circuit 24 obtains, from the wireless power reception apparatuses 3-1 to 3-N, the values of the required voltages Vc1 to VcN of the wireless power reception apparatuses and the values of the power reception voltages V1 to VN of the wireless power reception apparatuses. The control circuit 24 calculates the overall error voltage Es(n) by using Expression 1 to Expression 8 from the required voltages Vc1 to VcN and the power reception voltages V1 to VN, and stores the overall error voltage Es(n) inside. In step S6, the control circuit 24 determines again whether or not error voltages of all of the wireless power reception apparatuses 3-1 to 3-N satisfy the predetermined criterion. If the determination result is YES, the process proceeds to step S9. If the determination result is NO, the process proceeds to step S7. In step S7, the control circuit 24 determines whether or not the current overall error index Es(n) is smaller than the previous overall error index Es(n−1). If the determination result is YES, the process returns back to step S4. If the determination result is NO, the process proceeds to step S8. In step S8, the control circuit 24 reverses the direction of seeking of a frequency (that is, multiplies the step size Δf by −1), and returns back to step S4.

In steps S4 to S8, while the oscillation circuit 21 changes the frequency from f(n) to f(n+1), the frequency f(n) at which the minimum overall error index Es(n) is obtained is sought. If the overall error index Es is increased by changing the frequency from f(n−1) to f(n), the frequency f(n+1) may be set to a value being such that the sign of (f(n+1)−f(n)) is opposite to that of (f(n)−f(n−1)). If the overall error index Es is decreased by changing the frequency from f(n−1) to f(n), the frequency f(n+1) may be set to a value being such that the sign of (f(n+1)−f(n)) is the same as that of (f(n)−f(n−1)). The values |f(n+1)−f(n)| and |f(n)−f(n−1)| which correspond to the step size of the frequency (resolution of frequency adjustment) are not necessarily the same.

Steps S4 to S8 described above will be described in detail. In step S7, the control circuit 24 compares the first sum total Es(n−1) with the second sum total Es(n). The first sum total Es(n−1) is obtained by summing errors between the required voltages and the power reception voltages of the wireless power reception apparatuses in the case where the high-frequency power corresponding to the first frequency f(n−1) among the frequencies, i.e., the initial value f(0) to the final value f(L), is transmitted. The second sum total Es(n) is obtained by summing errors between the required voltages and the power reception voltages of the wireless power reception apparatuses in the case where high-frequency power corresponding to the second frequency f(n) among the frequencies is transmitted.

An operation performed if the determination result in step S7 is YES will be described. In this case, the second sum total Es(n) is smaller than the first sum total Es(n−1). Accordingly, the second frequency f(n) is a frequency at which the sum total of the errors is smaller. In this case, each of the errors is smaller.

Then, the control circuit 24 adds the step size Δf to the second frequency f(n) (in step S4), and sets a third frequency which is close to the second frequency f(n).

An operation performed if the determination result in step S7 is NO (operation in step S8) will be described. In this case, the second sum total Es(n) is larger than the first sum total Es(n−1). Accordingly, the first frequency f(n−1) is a frequency at which the sum total of the errors is smaller. In this case, each of the errors is smaller. Then, the control circuit 24 sets a third frequency which is close to the first frequency f(n−1).

The meaning of the third frequency which is close to the first frequency f(n−1) will be described. The third frequency means a frequency which is lower than a frequency of f(n)−|f(n)−f(n−1)|/2. That is, the third frequency is set to a frequency lower than the second frequency f(n). Accordingly, the direction of the seeking is reversed so that a frequency lower than the second frequency f(n) is used (in step S8).

As described above, the third frequency is repeatedly set to the third frequency among the frequencies f(0) to f(L) so that the sum total of the errors is decreased and that the errors are decreased. Accordingly, the errors of all of the wireless power reception apparatuses may converge on the predetermined criterion.

In step S9, the power reception voltages V1 to VN sufficiently match the required voltages Vc1 to VcN, respectively, and the control circuit 24 continues transfer of high-frequency power having the frequency f(n). In step S10, when the control circuit 24 receives a request to stop transmission of power, for example, from the wireless power reception apparatuses 3-1 to 3-N, the control circuit 24 ends transfer of the high-frequency power. The wireless power transfer system in FIG. 1 may achieve power transfer by controlling the output voltage of the wireless power transmission apparatus 2 so that the power reception voltage of each of the wireless power reception apparatuses 3-1 to 3-N satisfies the target voltage range.

The wireless power transfer system in FIG. 1 aims to decrease the overall error index Es obtained when the wireless power reception apparatuses are simultaneously supplied with power, while the balance of the relative error indexes E1 to EN is maintained. In the expression of deriving the relative error index En (1≤n≤N) of a wireless power reception apparatus 3-$n$, not only the required voltage Vcn and the power reception voltage Vn of the wireless power reception apparatus 3-$n$ but also the average Vcav of the required voltages of the wireless power reception apparatuses 3-1 to 3-N and the average Vav of the power reception voltages of the wireless power reception apparatuses 3-1 to 3-N are taken into account, enabling the balance of operations of the wireless power reception apparatuses 3-1 to 3-N to be adequately maintained.

Figure 7:
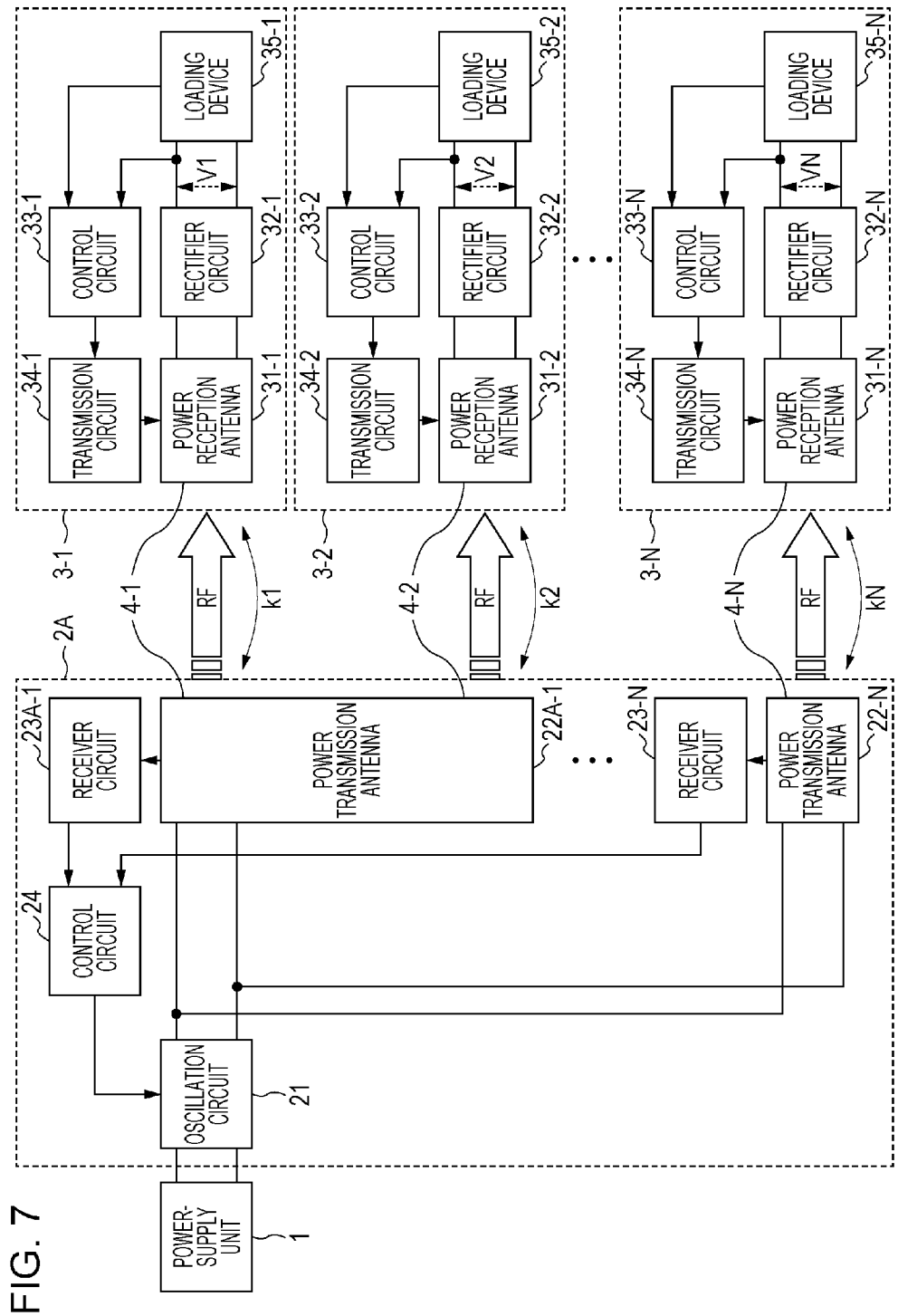
FIG. 7 is a block diagram illustrating the configuration of a wireless power transfer system according to a modified example of the first embodiment.

FIG. 7 is a block diagram illustrating the configuration of a wireless power transfer system according to a modified example of the first embodiment. The present disclosure is not limited to the one-to-one relationship between the power transmission antennas 22-1 to 22-N and the power reception antennas 31-1 to 31-N, and one power transmission antenna may supply power to multiple power reception antennas. A wireless power transmission apparatus 2A in FIG. 7 includes a power transmission antenna 22A-1 and a receiver circuit 23A-1 instead of the power transmission antennas 22-1 and 22-2 and the receiver circuits 23-1 and 23-2 of the wireless power transmission apparatus 2 in FIG. 1. The power transmission antenna 22A-1 is electromagnetically coupled to the power reception antennas 31-1 and 31-2 of the wireless power reception apparatuses 3-1 and 3-2. The receiver circuit 23A-1 connected to the power transmission antenna 22A-1 receives the load modulation signals transmitted from the wireless power reception apparatuses 3-1 and 3-2 to the wireless power transmission apparatus 2, and demodulates the load modulation signals. Similarly to the wireless power transfer system in FIG. 1, the wireless power transfer system in FIG. 7 may achieve power transfer by controlling the output voltage of the wireless power transmission apparatus 2A so that the power reception voltage of each of the wireless power reception apparatuses 3-1 to 3-N satisfies the target voltage range.

The oscillation circuit 21 typically converts received direct-current power into high-frequency power having the frequency f0, i.e., DC-RF (direct current-radio frequency) conversion. As the oscillation circuit 21, an amplifier achieving characteristics of high efficiency and low strain, such as a class D amplifier, a class E amplifier, or a class F amplifier, may be used, or a Doherty amplifier may be used. In the oscillation circuit 21, a low-pass filter, a band-pass filter, or a band-reject filter may be disposed downstream of a switching element generating an output signal having a strain component so that a high efficient sine wave is generated. The oscillation circuit 21 may convert received AC (alternating current) electric power into high-frequency power.

The power reception voltages V1 to VN of the wireless power reception apparatuses 3-1 to 3-N are not limited to a rectified direct current voltage as illustrated in FIGS. 1 and 7. When a wireless power reception apparatus does not include a rectifier circuit, the power reception voltage of the wireless power reception apparatus may be the output voltage of the power reception antenna. When the wireless power reception apparatus includes a frequency converter instead of a rectifier circuit, the power reception voltage of the wireless power reception apparatus may be an AC voltage which is output from the frequency converter. Also in this case, the control circuit 24 of the wireless power transmission apparatus 2 calculates the relative error indexes E1 to EN of the wireless power reception apparatuses and the overall error index Es from the required voltages Vc1 to VcN and the power reception voltages V1 to VN.

To transmit the values the required voltages Vc1 to VcN and the values of the power reception voltages V1 to VN to the wireless power transmission apparatus 2, the wireless power reception apparatuses 3-1 to 3-N may use paths other than those between the power reception antennas 31-1 to 31-N and the power transmission antennas 22-1 to 22-N, or may use a communication method other than the method using a load modulation signal.

Second Embodiment

A wireless power transfer system according to a second embodiment has a configuration different from that according to the first embodiment in that the oscillation circuit 21 has a variable output voltage. When the output voltage of the oscillation circuit 21 is increased/decreased, the power reception voltages V1 to VN may be increased/decreased while the ratio among the power reception voltages V1 to VN of the wireless power reception apparatuses 3-1 to 3-N is maintained.

Figure 8:
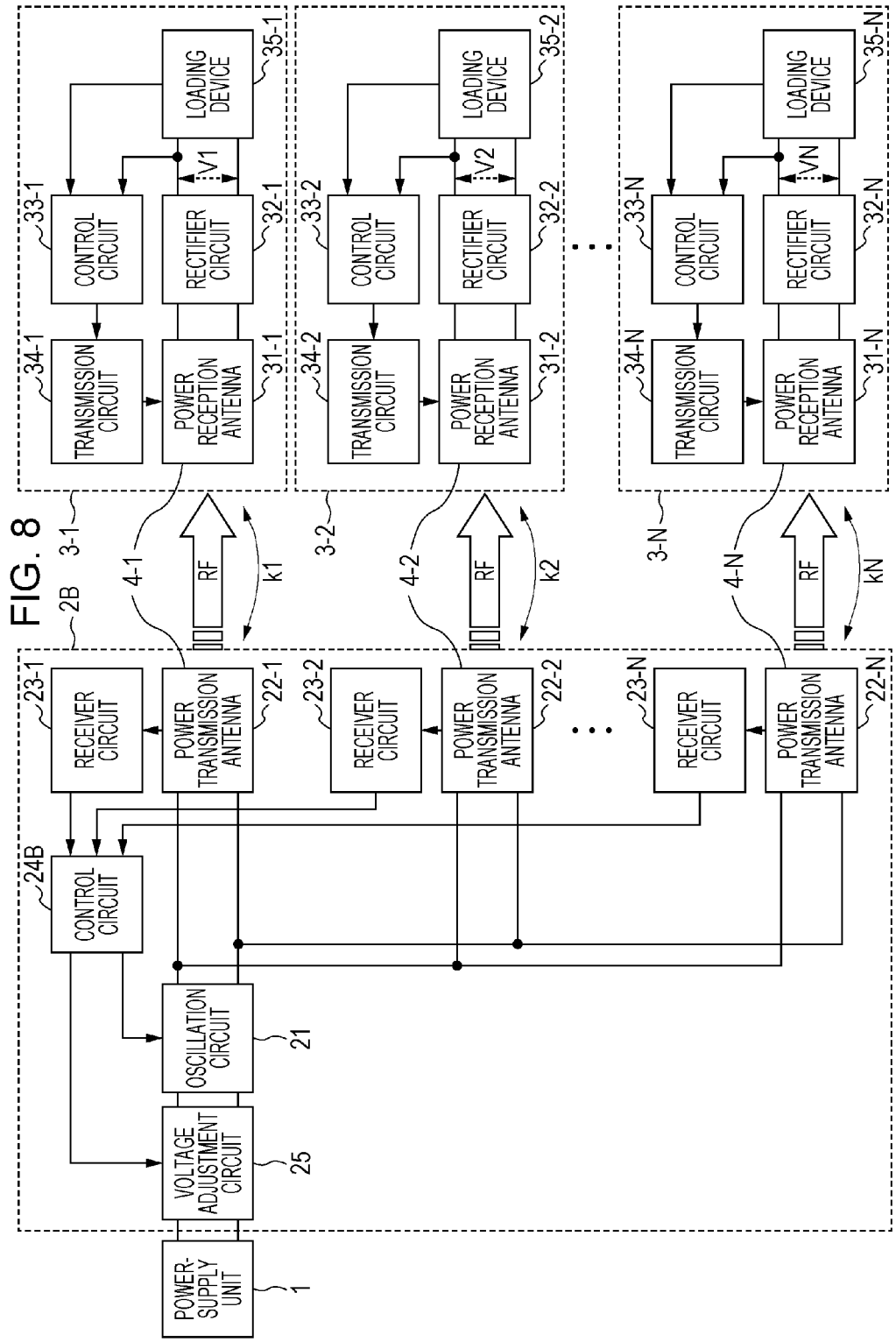
FIG. 8 is a block diagram illustrating the configuration of a wireless power transfer system according to a second embodiment.

FIG. 8 is a block diagram illustrating the configuration of the wireless power transfer system according to the second embodiment. A wireless power transmission apparatus 2B in FIG. 8 further includes a voltage adjustment circuit 25 in addition to the configuration of the wireless power transmission apparatus 2 in FIG. 1, and includes a control circuit 24B instead of the control circuit 24 in FIG. 1. The voltage adjustment circuit 25 generates a variable output voltage from the input voltage obtained from the power-supply unit 1 supplying direct current. The voltage adjustment circuit 25 is, for example, a DC/DC converter or an AC/DC converter. The oscillation circuit 21 generates high-frequency power having a variable frequency from the output voltage of the voltage adjustment circuit 25. The oscillation circuit 21 has a variable input voltage (output voltage of the voltage adjustment circuit 25). As a result, the oscillation circuit 21 has a variable output voltage. The control circuit 24B controls the voltage adjustment circuit 25 so as to change the output voltage of the voltage adjustment circuit 25, and controls the oscillation circuit 21 so as to change the frequency f0 of the high-frequency power generated by the oscillation circuit 21.

Figure 9:
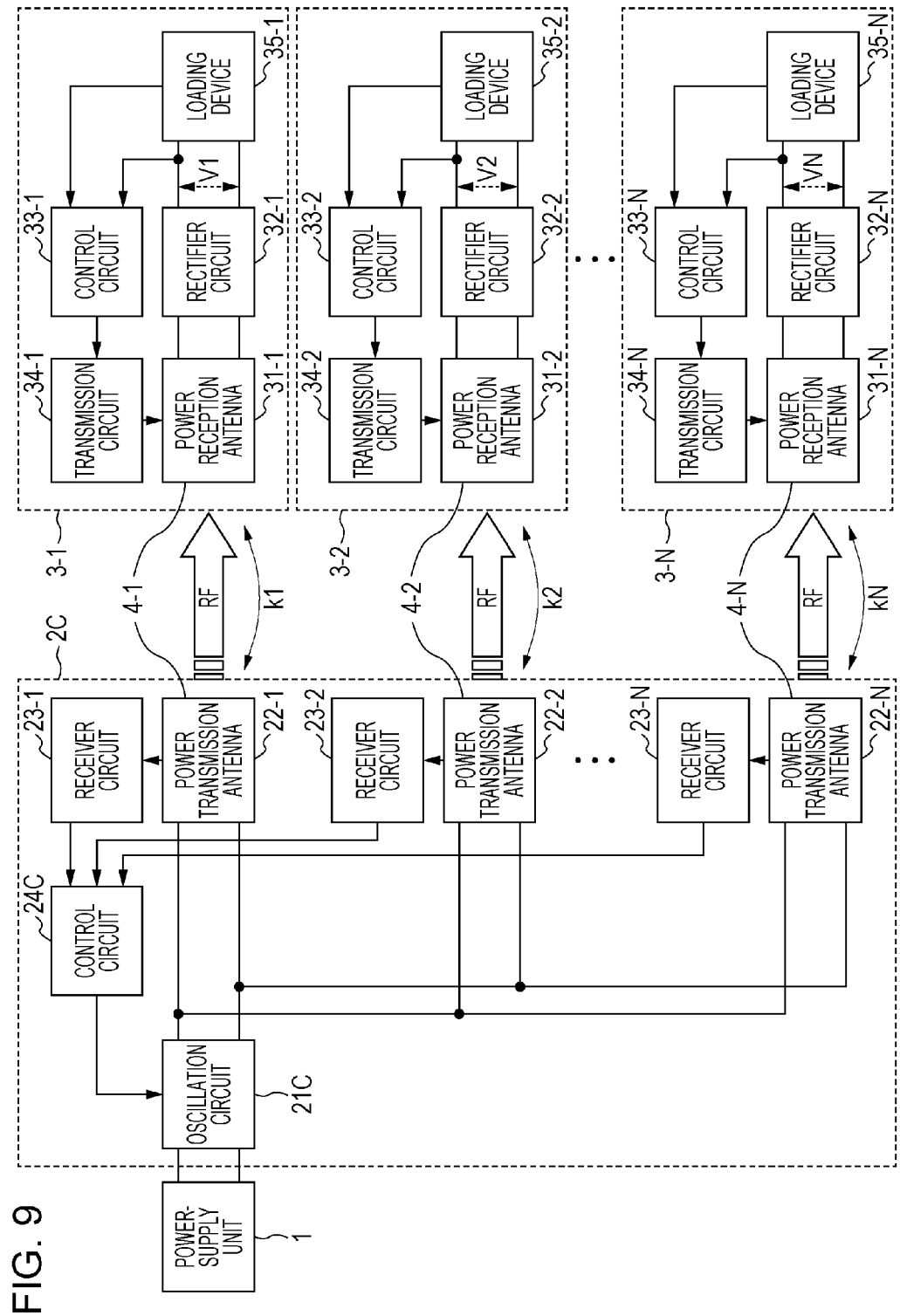
FIG. 9 is a block diagram illustrating the configuration of a wireless power transfer system according to a modified example of the second embodiment.

FIG. 9 is a block diagram illustrating the configuration of a wireless power transfer system according to a modified example of the second embodiment. A wireless power transmission apparatus 2C in FIG. 9 includes an oscillation circuit 21C and a control circuit 24C instead of the oscillation circuit 21 and the control circuit 24 of the wireless power transmission apparatus 2 in FIG. 1. The oscillation circuit 21C is an inverter circuit which generates high-frequency power having a variable output voltage by changing the phase of signals for switching multiple switches.

Figure 10:
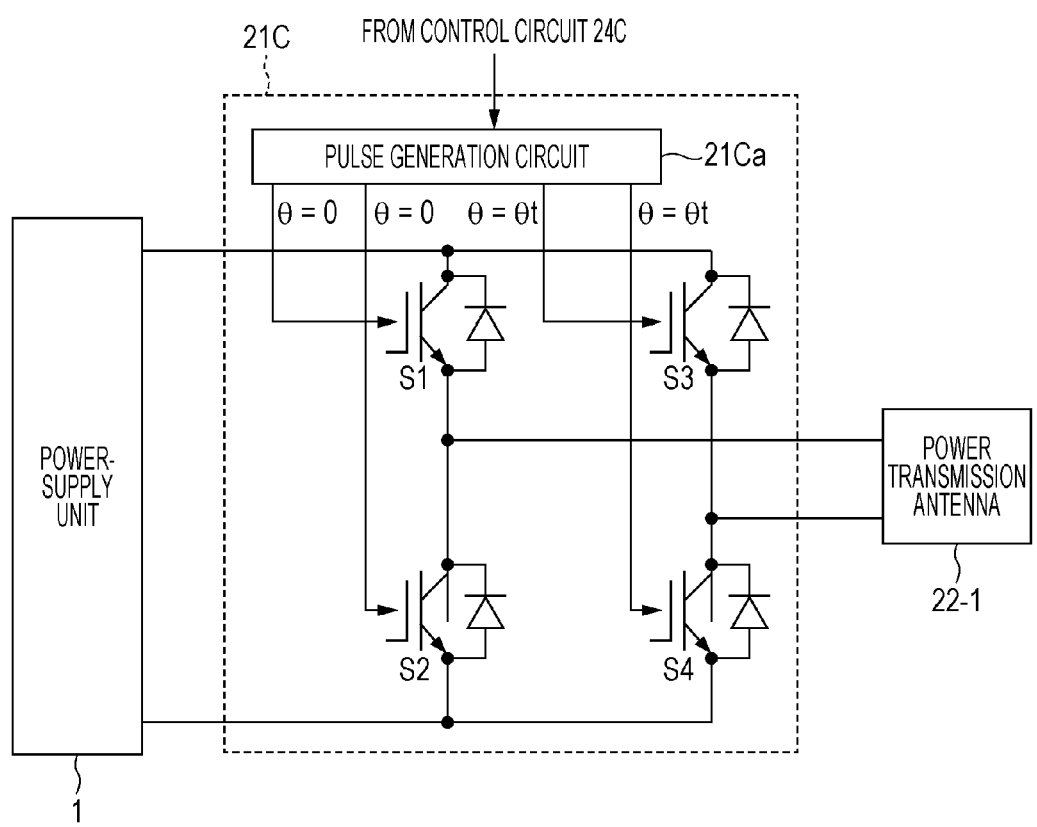
FIG. 10 is a circuit diagram illustrating a detailed configuration of an oscillation circuit illustrated in FIG. 9.

FIG. 10 is a circuit diagram illustrating a detailed configuration of the oscillation circuit 21C in FIG. 9. The oscillation circuit 21C is a full-bridge inverter circuit including multiple switches S1 to S4 and a pulse generation circuit 21Ca. The pulse generation circuit 21Ca generates signals for switching the switches S1 to S4 under control of the control circuit 24C. The switch S1 is closed when the switch S2 is open. The switch S2 is closed when the switch S1 is open. Similarly, the switch S3 is closed when the switch S4 is open. The switch S4 is closed when the switch S3 is open. A signal for switching the switches S3 and S4 has a predetermined phase difference θt with respect to a signal for switching the switches S1 and S2. When the phase difference θt is changed, the output voltage of the oscillation circuit 21C is changed.

The control circuit 24C controls the oscillation circuit 21C so that the frequency f0 and the output voltage of the high-frequency power generated by the oscillation circuit 21C are changed.

In FIG. 9, the oscillation circuit 21C may be an inverter circuit which generates high-frequency power having an output voltage which is variable by performing switching with a variable duty ratio, not by changing of the phase of the signals for switching the multiple switches.

The wireless power transfer system according to the second embodiment increases/decreases the output voltage of the oscillation circuit 21 by using one of the above-described three means or by using a combination of these, and makes the power reception voltages V1 to VN close to the required voltages Vc1 to VcN, respectively, while the ratio among the power reception voltages V1 to VN of the wireless power reception apparatuses 3-1 to 3-N is substantially maintained.

Figure 11:
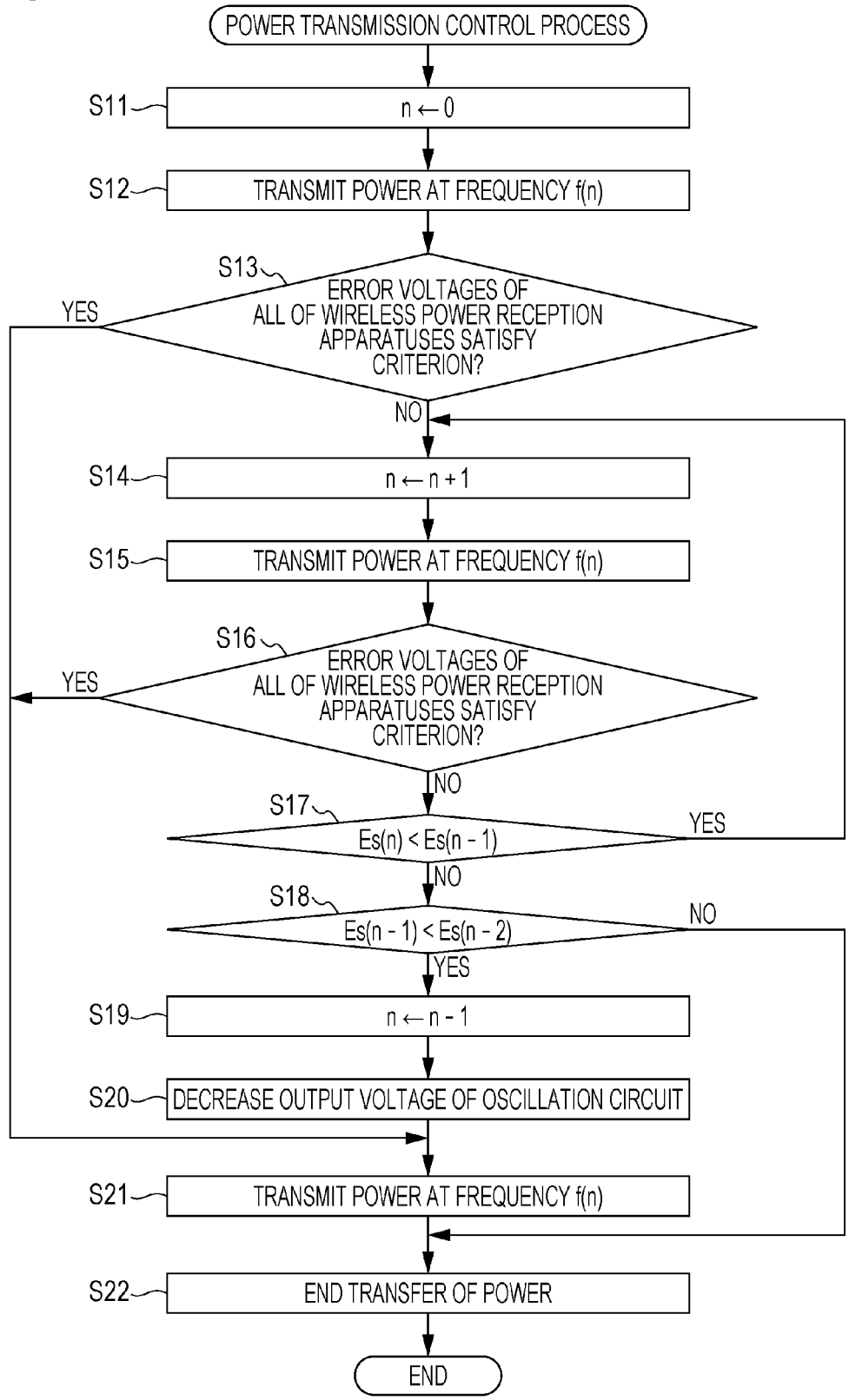
FIG. 11 is a flowchart of a power transmission control process performed by a control circuit of a wireless power transmission apparatus illustrated in FIG. 8.

FIG. 11 is a flowchart of a power transmission control process performed by the control circuit 24B of the wireless power transmission apparatus 2B in FIG. 8. After the control circuit 24B minimizes the overall error index Es, when, in at least one of the wireless power reception apparatuses 3-1 to 3-N, the error between the required voltage and the power reception voltage of the wireless power reception apparatus exceeds a predetermined threshold value, the control circuit 24B decreases the output voltage of the oscillation circuit 21 until the error becomes equal to or smaller than the threshold value. Steps S11 to S16 and S21 to S22 in FIG. 11 are similar to steps S1 to S6 and S9 to S10 in FIG. 6. In step S17, the control circuit 24B determines whether or not the current overall error index Es(n) is smaller than the previous overall error index Es(n−1). If the determination result is YES, the process returns back to step S14. If the determination result is NO, the process proceeds to step S18. In step S18, the control circuit 24B determines whether or not the overall error index Es(n−1) which is obtained in the previous iteration n−1 is smaller than the overall error index Es(n−2) which is obtained in the second previous iteration n−2. If the determination result is YES, the process proceeds to step S19. If the determination result is NO, the process proceeds to step S22. If the determination result is YES in step S18, the overall error index Es(n−1) which is obtained in the previous iteration n−1 is the minimum. Therefore, when the high-frequency power is transferred at the frequency f(n−1), the errors between the required voltages Vc1 to VcN and the power reception voltages V1 to VN are substantially the same. In step S19, the control circuit 24B decrements the parameter n by 1. In step S20, the control circuit 24B decreases the output voltage of the oscillation circuit 21. By decreasing the output voltage of the oscillation circuit 21, the errors between the required voltages Vc1 to VcN and the power reception voltages V1 to VN may be further decreased while the ratio among the power reception voltages V1 to VN of the wireless power reception apparatuses 3-1 to 3-N is substantially maintained. The voltage ratio to be decreased is Vc1/V1. In step S21, the power reception voltages V1 to VN sufficiently match the required voltages Vc1 to VcN, respectively, and the control circuit 24B continues transfer of the high-frequency power having the frequency f(n). In step S22, when the control circuit 24B receives a request to stop transmission of power, for example, from the wireless power reception apparatuses 3-1 to 3-N, the control circuit 24B ends transfer of the high-frequency power.

In step S20 in FIG. 11, in the case where all of the wireless power reception apparatuses 3-1 to 3-N have an error voltage which satisfies the predetermined criterion, and where there is room for further increasing the power reception voltages V1 to VN, the output voltage of the oscillation circuit 21 may be increased.

As described by referring to FIG. 11, after the frequency at which the overall error index Es is minimized is found, the output voltage of the oscillation circuit 21 is increased/decreased, whereby the errors between the required voltages Vc1 to VcN and the power reception voltages V1 to VN may be further decreased. The inventor found that the frequency characteristics of the overall error index Es hardly change before/after increase/decrease in the output voltage of the oscillation circuit 21 when the relative error indexes E1 to EN of the wireless power reception apparatuses 3-1 to 3-N are defined by using Expression 1 to Expression 8. Therefore, in a stage in which the overall error index Es decreased through the frequency control has not converged, when the voltage control is performed, the overall error index Es hardly changes. Accordingly, while the frequency control and the voltage control are simultaneously performed, it is possible for the power reception voltages of multiple wireless power reception apparatuses which simultaneously operate to converge within a target range.

The power transmission control process in FIG. 11 is performed also by the control circuit 24C in FIG. 9 in a similar manner.

Third Embodiment

Figure 12:
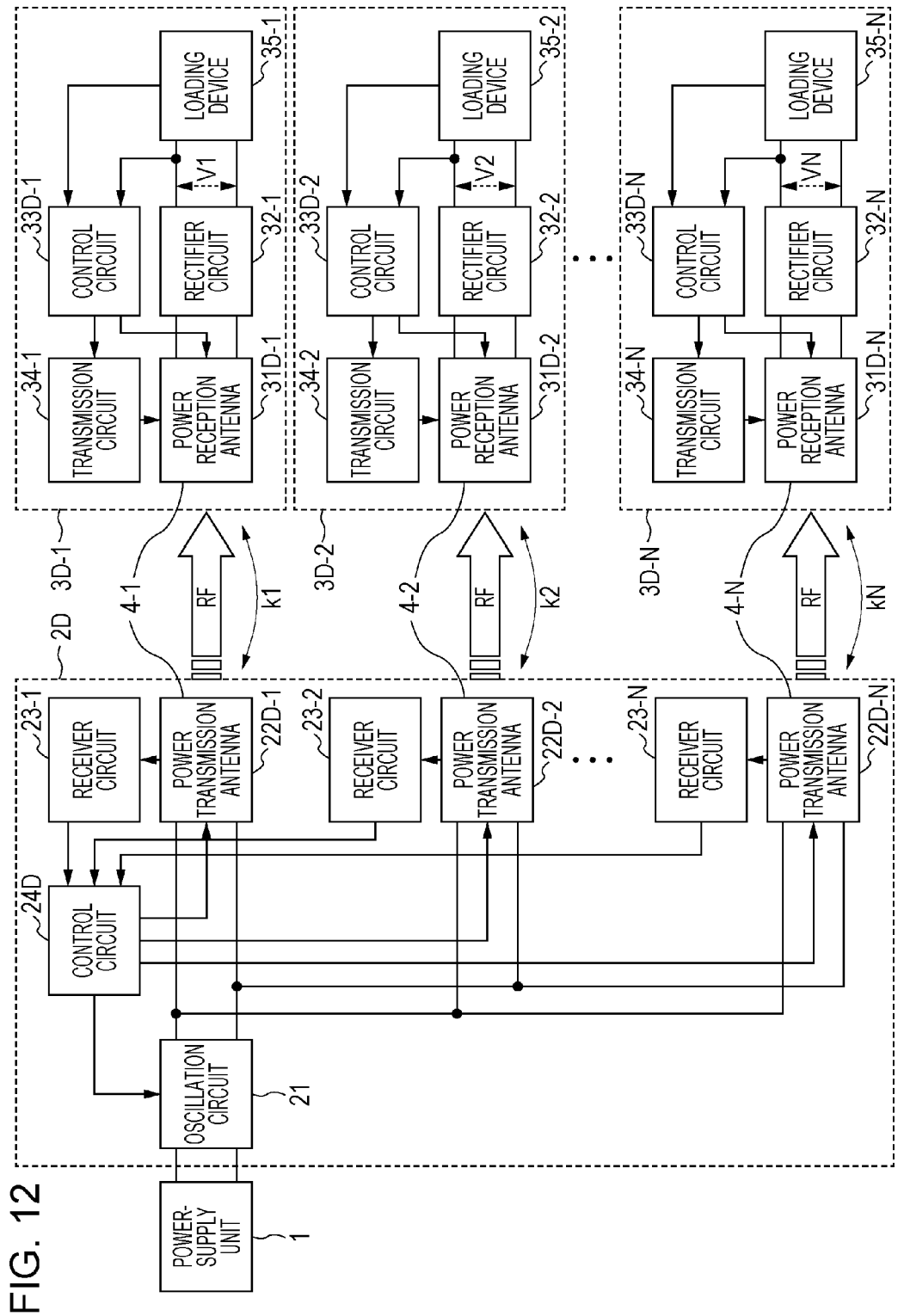
FIG. 12 is a block diagram illustrating the configuration of a wireless power transfer system according to a third embodiment.

FIG. 12 is a block diagram illustrating the configuration of a wireless power transfer system according to the third embodiment. In the wireless power transfer system in FIG. 12, at least one of a power transmission antenna and a power reception antenna has a variable circuit constant, and the control circuit of the wireless power transmission apparatus changes at least one of the circuit constant of the power transmission antenna and that of the power reception antenna.

A wireless power transmission apparatus 2D in FIG. 12 includes power transmission antennas 22D-1 to 22D-N and a control circuit 24D instead of the power transmission antennas 22-1 to 22-N and the control circuit 24 of the wireless power transmission apparatus 2 in FIG. 1. Each of the power transmission antennas 22D-1 to 22D-N has a variable circuit constant. The control circuit 24D changes the circuit constant of each of the power transmission antennas 22D-1 to 22D-N.

A wireless power reception apparatus 3D-1 in FIG. 12 includes a power reception antenna 31D-1 and a control circuit 33D-1 instead of the power reception antenna 31-1 and the control circuit 33-1 of the wireless power reception apparatus 3-1 in FIG. 1. The power reception antenna 31D-1 has a variable circuit constant. The control circuit 33D-1 changes the circuit constant of the power reception antenna 31D-1 under control of the control circuit 24D of the wireless power transmission apparatus 2D. Other wireless power reception apparatuses 3D-2 to 3D-N have a configuration similar to that of the wireless power reception apparatus 3D-1.

Figure 13:
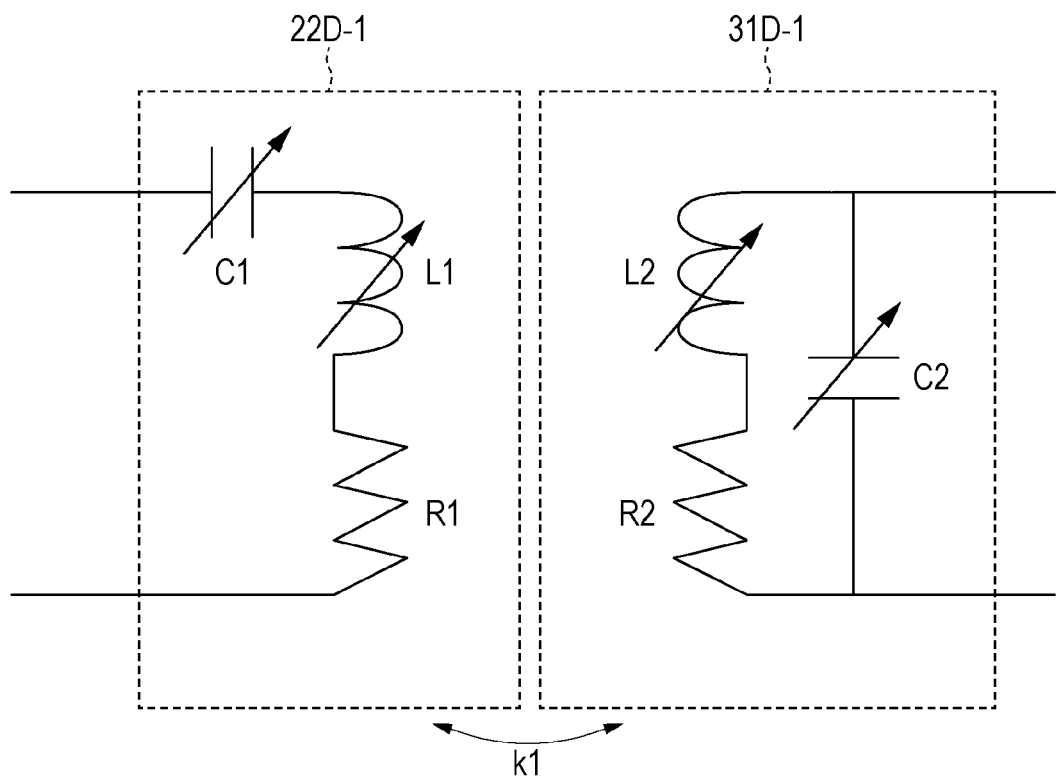
FIG. 13 is an equivalent circuit diagram illustrating exemplary implementation of a power transmission antenna and a power reception antenna illustrated in FIG. 12.
Figure 14:
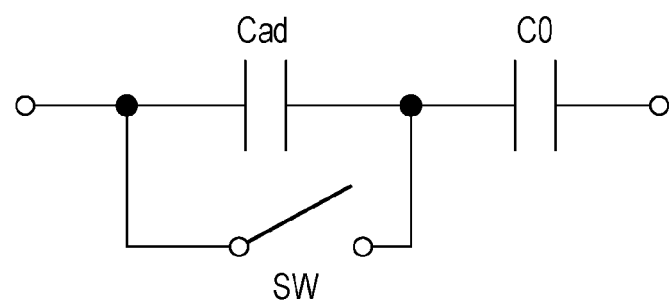
FIG. 14 is a circuit diagram illustrating exemplary implementation of a capacitor illustrated in FIG. 13.

FIG. 13 is an equivalent circuit diagram illustrating exemplary implementation of the power transmission antenna 22D-1 and the power reception antenna 31D-1 in FIG. 12. The circuit constant (an inductance or a capacitance) of at least one of an inductor and a capacitor which are included in at least one of the power transmission antenna 22D-1 and the power reception antenna 31D-1 is variable. FIG. 14 is a circuit diagram illustrating exemplary implementation of the capacitor C1 in FIG. 13. FIG. 14 illustrates the configuration in the case where the power transmission antenna 22D-1 has a resonant capacitor having a variable capacitance, as an example. The circuit configuration in FIG. 14 enables a capacitance C0 or the combined capacitance of the capacitance C0 and a capacitance Cad to be selected by switching a switch SW. For example, the value of the capacitance Cad to be added ranges, for example, approximately from 0.5 to 10 times the capacitance C0. The control circuit 24D transmits a control signal which is necessary to change a circuit constant, and controls the circuit characteristics of an inductance, a capacitance, or the like. As a result, the antenna characteristics is made variable.

In the third embodiment, at least one of the circuit constant of a power transmission antenna and that of a power reception antenna is changed, whereby the frequency characteristics of the overall error index Es is changed. The equivalent impedance of at least one of a power transmission antenna and a power reception antenna is changed. Therefore, the frequency characteristics of the overall error index Es are adjusted to a different trend compared with the characteristics before the change. Even when the power transmission control processes according to the first and second embodiments are performed, it may be still difficult for all of the power reception voltages V1 to VN to converge to the required voltages Vc1 to VcN. The configuration of the third embodiment is introduced to control the frequency characteristics of the overall error index Es, enabling the probability of solving this problem to be increased.

At least one of the circuit constant of a power transmission antenna and that of a power reception antenna may be controlled by the control circuits 33D-1 to 33D-N of the wireless power reception apparatuses 3D-1 to 3D-N.

The effect obtained by changing a circuit constant is independent of the effect obtained through the frequency control introduced in the first embodiment and the effect obtained through the voltage control introduced in the second embodiment. Therefore, independently of timings at which the frequency and the voltage are controlled, the circuit constant may be controlled.

Modified Example

When the power reception voltages of the wireless power reception apparatuses allow a predetermined error range, the definition of the average Vav of power reception voltages may be modified in consideration of the error range. For example, when allowable power reception voltage for the required voltage Vc1 is defined as being within a range of (Vc10±Vc1e), the value of the required voltage Vc1 to be reflected in the average Vav of power reception voltages may be selected from the range from (Vc10−Vc1e) to (Vc10+Vc1e).

When all of the wireless power reception apparatuses which request transmission of power fail to be supplied with power satisfying the requirement, some of the wireless power reception apparatuses to be supplied with power may be excluded, and a condition which achieves a decrease in the overall error index Es may be sought for only the remaining wireless power reception apparatuses. On the basis of the result, power may be supplied. In this case, a switch element which is openable and closable by the control circuit 24 of the wireless power transmission apparatus 2 is disposed between the oscillation circuit 21 and each of the power transmission antennas 22-1 to 22-N. On a path connected to a power transmission antenna facing the power reception antenna of a wireless power reception apparatus which is excluded from those to be supplied with power, the switch is set to the non-conductive state.

Referring to FIGS. 15 to 18, simulation results of the embodiments of the present disclosure will be described.

Figure 15:
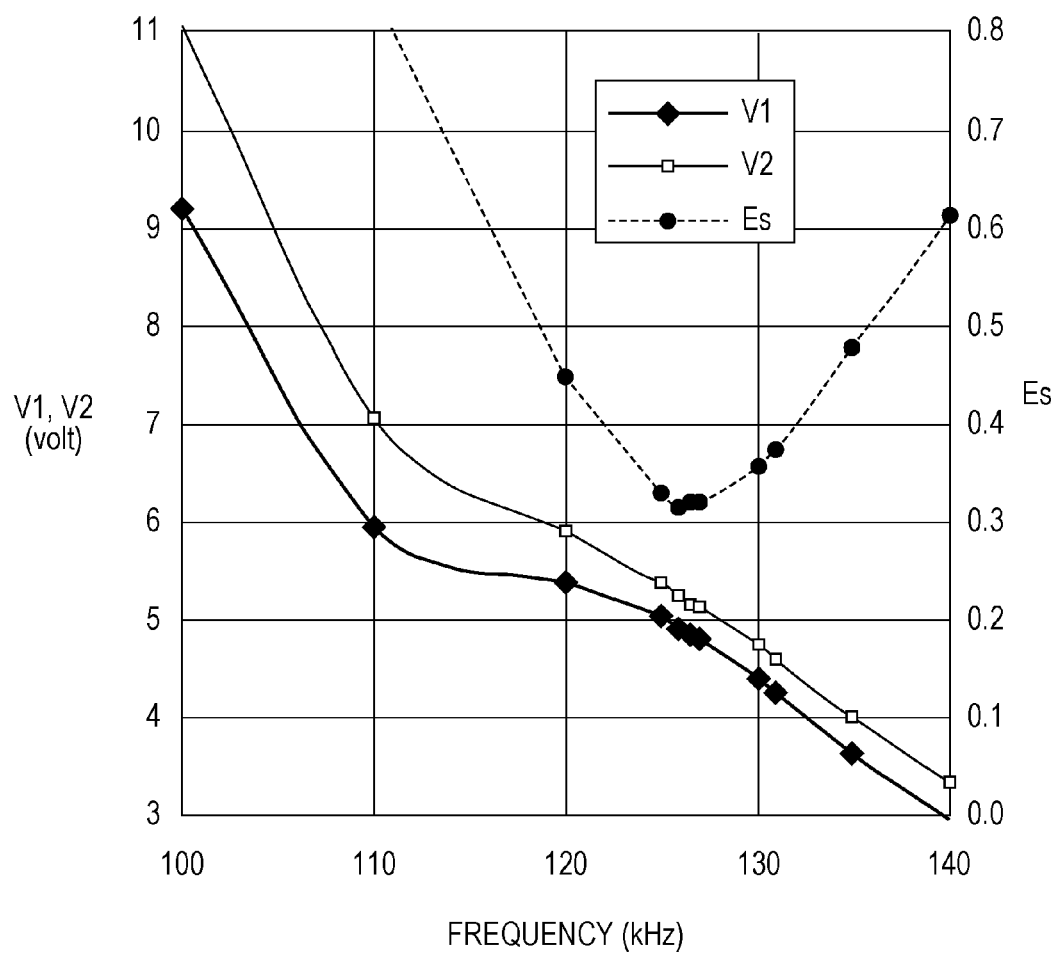
FIG. 15 is a graph illustrating frequency characteristics of power reception voltages and an overall error index according to a first example.

FIG. 15 is a graph illustrating frequency characteristics of the power reception voltages V1 and V2 and the overall error index Es according to a first example. As the first example, a wireless power transfer system was prepared in which one oscillation circuit (full-bridge inverter circuit) simultaneously charges symmetrical transmission and reception antenna pairs having a coupling coefficient of 0.25 in an operating frequency range from 100 kHz to 140 kHz. There were two wireless power reception apparatuses 3-1 and 3-2, each of which required a charging voltage of 5 V, and an allowable charging voltage error was 200 mV. The batteries of the wireless power reception apparatuses 3-1 and 3-2 required 1.16 A and 0.93 A, respectively, and were in an unsymmetrical load state. For the required voltage Vc1=Vc2=5 V, the oscillation circuit was driven with direct current of 8 V. While the operating frequency f0 was changed, the power reception voltages V1 and V2 were measured. The wireless power reception apparatuses 3-1 and 3-2 included the rectifier circuits 32-1 and 32-2 constituted by a diode bridge, downstream of the power reception antennas 31-1 and 31-2, and the power reception voltages V1 and V2 of direct current were measured. Under the assumption that Vcav=5 V, the relative error indexes E1 and E2 were calculated by using Expression 1, and the overall error index Es was calculated by using Expression 5.

According to FIG. 15, frequency characteristics of the overall error index Es shows that the overall error index Es is minimized at 126.5 kHz. The power reception voltages V1 and V2 at 126.5 kHz are 4.842 V and 5.16 V, respectively, and charging control at 5 V±0.16 V may be performed.

Figure 16:
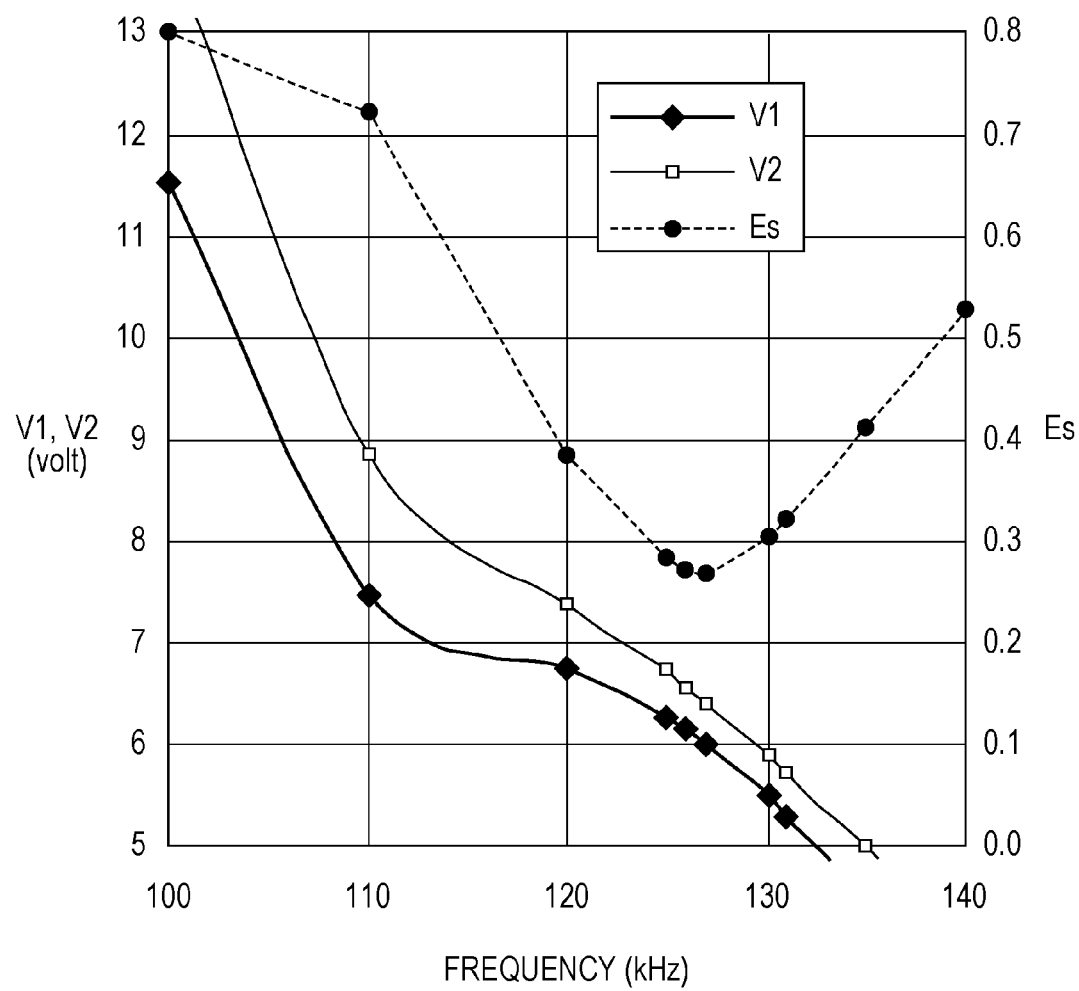
FIG. 16 is a graph illustrating frequency characteristics of the power reception voltages and the overall error index in the case where the input voltage of an oscillation circuit is 10 V, according to a second example.
Figure 17:
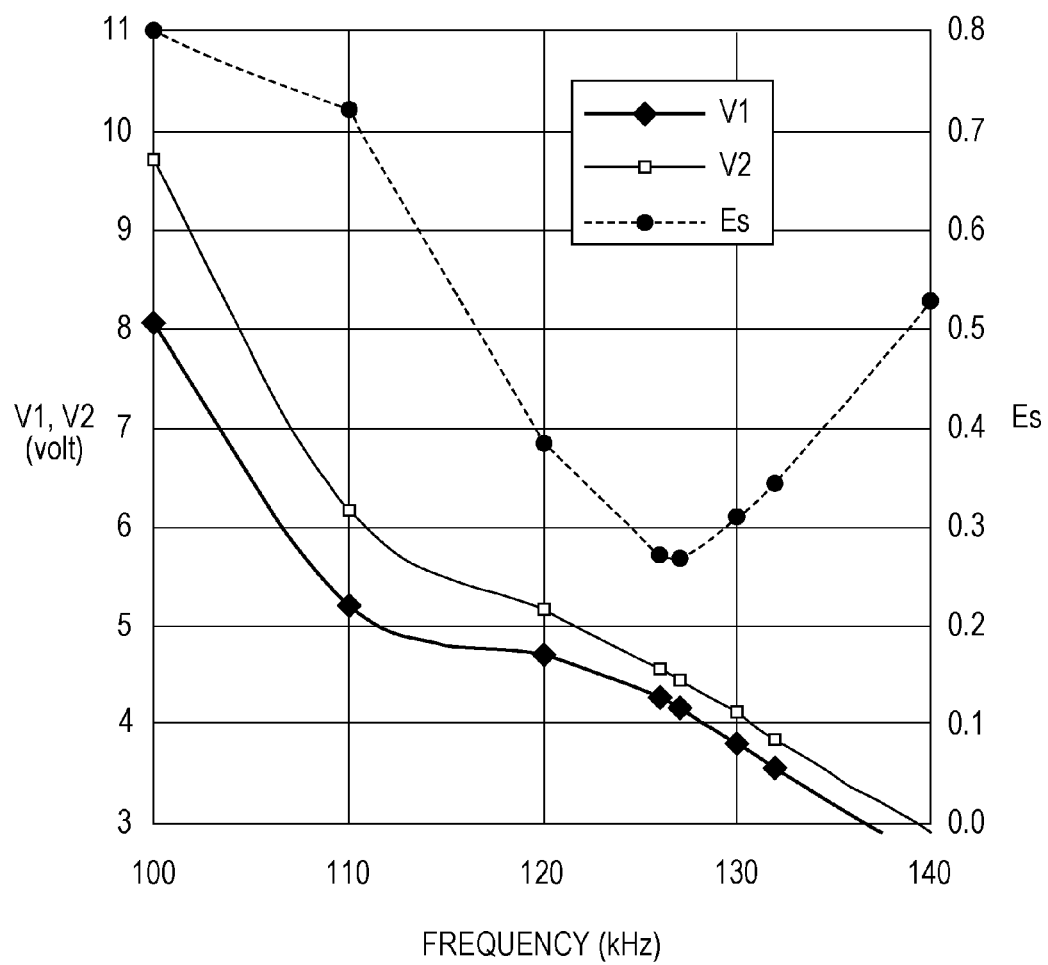
FIG. 17 is a graph illustrating frequency characteristics of the power reception voltages and the overall error index in the case where the input voltage of the oscillation circuit is 6.94 V, according to the second example.

FIG. 16 is a graph illustrating frequency characteristics of the power reception voltages V1 and V2 and the overall error index Es according to a second example (when the input voltage of the oscillation circuit 21 is 10 V). A wireless power transfer system of the second example is different from that of the first example in that a DC/DC converter which decreases an input voltage of 12 V to a predetermined voltage was connected upstream of the oscillation circuit. The required voltages Vc1 and Vc2 of the wireless power reception apparatuses 3-1 and 3-2 according to the second example were 4.3 V, and the allowable charging voltage error was 150 mV. The batteries of the wireless power reception apparatuses 3-1 and 3-2 required 1 A and 0.8 A, respectively, and were in an unsymmetrical load state. FIG. 16 shows that, since the overall error index Es becomes minimum at 127 kHz, the optimal frequency is 127 kHz for simultaneous charging of the wireless power reception apparatuses 3-1 and 3-2. FIG. 17 is a graph illustrating frequency characteristics of the power reception voltages V1 and V2 and the overall error index Es according to the second example (when the input voltage of the oscillation circuit 21 is 6.94 V). The operating condition of the DC/DC converter was adjusted, and the direct current voltage which was input to the oscillation circuit 21 was controlled. The average of the power reception voltages V1 and V2 obtained when the operation was carried out with the input voltage being set to 10 V was 6.2 V. Accordingly, a voltage, 10 (V)×4.3 (V)/6.2 (V)=6.94 (V), was selected as the input voltage. As is clear from a comparison result between FIG. 16 and FIG. 17, it is shown that the frequency characteristics of the overall error index Es do not depend on the input voltage of the oscillation circuit, and that, similarly to the case of the input voltage of 10 V, the optimal frequency for simultaneous charging of the wireless power reception apparatuses 3-1 and 3-2 is 127 kHz. Use of the frequency control function and the voltage control function causes the values V1=4.173 V and V2=4.440 V to be obtained, enabling both of the power reception voltages to satisfy the required voltage of 4.3 V (±140 mV).

Figure 18:
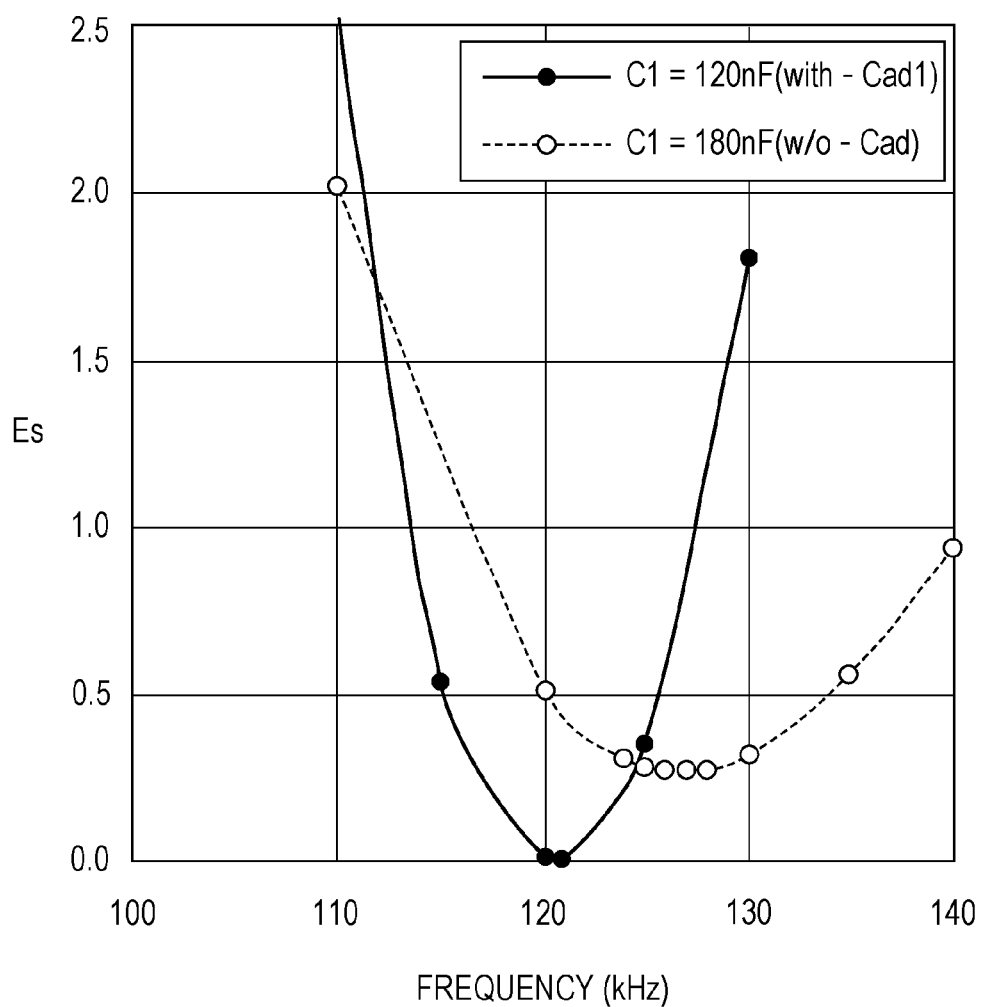
FIG. 18 is a graph illustrating frequency characteristics of the overall error index according to a third example.

FIG. 18 is a graph illustrating frequency characteristics of the overall error index Es according to a third example. In the first and second examples, a resonant circuit was formed in the power transmission antenna circuit by connecting an inductor to a series capacitor of 180 nF. In the third example, a capacitor in the power transmission antenna in the first and second examples was replaced with a variable capacitor circuit illustrated in FIG. 14, in which C0=180 nF and Cad=360 nF. In the power transmission antenna 22D-1 facing the wireless power reception apparatus 3-1 which had a higher load among the wireless power reception apparatuses 3-1 and 3-2, the capacitance was capable of switching between 180 nF and 120 nF which is a combined capacitance of 180 nF and 360 nF.

The required voltage of the wireless power reception apparatuses 3-1 and 3-2 in the third example was 4.3 V (Vcav=4.3 V), and the allowable charging voltage error was 50 mV. The batteries of the wireless power reception apparatuses 3-1 and 3-2 were 1 A and 0.5 A, respectively, and were in an unsymmetrical load state. In FIG. 18, a dotted line indicates a case in which both of the capacitances of the capacitors of the two power transmission antennas 22D-1 and 22D-2 were set to a fixed value of 180 nF, and in which the input voltage of the oscillation circuit 21 was set to 8 V (comparative example). In FIG. 18, a solid line indicates a case in which the circuit constant was adjusted only for the power transmission antenna 22D-1 facing the wireless power reception apparatus 3-1 and in which the capacitance of the capacitor was changed to 120 nF (third example). FIG. 18 shows that the minimum of the overall error index Es in the third example is smaller than that in the comparative example. This indicates that the variable capacitor circuit is controlled so that the resonant capacitance of the power transmission antenna supplying power to a wireless power reception apparatus whose load is heavy is reduced, whereby the power reception voltages of multiple wireless power reception apparatuses may converge to required voltages in a good balance.

To verify this more specifically, in the comparative example, in the case where the input voltage of the oscillation circuit 21 (output voltage of the DC/DC converter) was set to 6.6 V which is the optimal value, and where the oscillation circuit 21, to which 127 kHz was set, was operated, the errors from the required voltages Vc1 and Vc2 to the power reception voltages V1 and V2 were not able to be reduced from −359 mV and 366 mV, respectively. In contrast, in the third example, in the case where the input voltage of the oscillation circuit 21 was set to 5.3 V which is an optimal value, and where the oscillation circuit 21, to which 121 kHz was set, was operated, the errors from the required voltages Vc1 and Vc2 to the power reception voltages V1 and V2 were able to be reduced in ranges of +22 mV and −21 mV, respectively.

The embodiments disclosed herein are examples in every aspect, and are not intended to be limiting. It is intended that the scope of the present disclosure is determined, not by the above description, but by the scope of claims, and encompasses all aspects including the scope of claims and modifications within the meaning and the scope of equivalents.

When one wireless power transmission apparatus simultaneously supplies power to multiple wireless power reception apparatuses, the wireless power transmission apparatus and the wireless power transfer system according to the present disclosure do not need a configuration in which an oscillation circuit is provided for each of the wireless power reception apparatuses, achieving high accurate control of the output voltage of the wireless power transmission apparatus. Therefore, a wireless power transmission apparatus (for example, a contactless charger) with low cost and high versatility may be provided.

The wireless power transmission apparatus and the wireless power transfer system according to the present disclosure may be applied to a charging system for electronic equipment, an electric motorcycle, an electric power-assisted bicycle, or an electric vehicle using a battery. In addition, the wireless power transmission apparatus and the wireless power transfer system according to the present disclosure may be applied to a power-supply system for various types of equipment, such as audio-video equipment and an electrical appliance. Examples of the audio-video equipment include a smartphone, a tablet terminal, a television, and a laptop personal computer, and examples of the electrical appliance include a washing machine, a refrigerator, and an air conditioner.

What is claimed is:

1. A wireless power transmission method, comprising:
   transmitting to each of a plurality of wireless power reception apparatuses, using a power transmission antenna, each of a plurality of high-frequency power corresponding to a first frequency and each of a plurality of high-frequency power corresponding to a second frequency;
   obtaining from each of the plurality of the wireless power reception apparatuses, using a plurality of receiver circuits, i) a required voltage value that corresponds to each of the plurality of the wireless power reception apparatuses, ii) a first power reception voltage value that corresponds to each of the plurality of the wireless power reception apparatuses and that corresponds to the first frequency, and iii) a second power reception voltage value that corresponds to each of the plurality of the wireless power reception apparatuses and that corresponds to the second frequency; and
   summing, using a control circuit, first errors to obtain a first sum total, each of the first errors occurring between i) the required voltage value that corresponds to each of the plurality of the receiver circuits and ii) the first power reception voltage value that corresponds to each of the plurality of the receiver circuits,
   wherein, in the summing by the control circuit, the control circuit sums second errors to obtain a second sum total, each of the second errors occurring between i) the required voltage value that corresponds to each of the plurality of the receiver circuits and ii) the second power reception voltage value that corresponds to each of the plurality of the receiver circuits,
   wherein, in the transmitting to each of the plurality of wireless power reception apparatuses, the control circuit controls the power transmission antenna to transmit, to each of the plurality of the wireless power reception apparatuses, each of a plurality of high-frequency power corresponding to a third frequency that is close to a smaller one of the first sum total and the second sum total, to converge each of third errors occurring between i) the required voltage value and ii) a third power reception voltage value that corresponds to each of the plurality of the wireless power reception apparatuses and that corresponds to the third frequency, to be within a predetermined criterion error.

2. The wireless power transmission method according to claim 1, further comprising:
   comparing, using the control circuit, a smaller sum total out of the first sum total and the second sum total with a third sum total obtained by summing errors, each of which occurs between the required voltage and the power reception voltage of the corresponding one of the plurality of wireless power reception apparatuses in the case where the high-frequency power of the third frequency is transmitted, setting a fourth frequency closer to a frequency corresponding to a further smaller sum total out of among the smaller sum total and the third sum total, and controlling the power transmission antenna to transmit the high-frequency power of the fourth frequency of the corresponding one to each of the plurality of wireless power reception apparatuses, and
   using the control circuit, determining the frequency at which a sum total of the errors is minimized by setting the fourth frequency repeatedly, and controlling the power transmission antenna to transmit each of a plurality of the high-frequency power corresponding to the frequency at which the sum total of the errors is minimized to each of the plurality of wireless power reception apparatuses.

3. The wireless power transmission method according to claim 2, further comprising:

changing, using a voltage adjustment circuit, a voltage received from a power-supply unit to output the voltage to the power transmission antenna, so as to output the voltage to the power transmission antenna, and after the sum total of the errors is minimized, when an error between the required voltage and the power reception voltage exceeds a predetermined threshold value in at least one of the plurality of wireless power reception apparatuses, decreasing, using the control circuit, the voltage which is outputted from the voltage adjustment circuit to the power transmission antenna, and setting the value of the error between the required voltage and the power reception voltage of each of the plurality of the wireless power reception apparatuses to become equal to or smaller than the threshold value.

4. The wireless power transmission method according to claim 1, further comprising when at least one of the power transmission antenna and a power reception antenna of each of the plurality of wireless power reception apparatuses includes a variable circuit element having a variable circuit constant, changing, using the control circuit, at least one of the variable circuit constant of the power transmission antenna and the variable circuit constant of the power reception antenna.

* * * * *